United States Patent [19]

Furuhara et al.

[11] Patent Number: 5,222,685
[45] Date of Patent: Jun. 29, 1993

[54] MAGNETIC RECORDING/REPRODUCING APPARATUS HAVING TORQUE GENERATOR GENERATING THE MOST APPROPRIATE TORQUE AND ROTATION DETECTING FUNCTION

[75] Inventors: Hiroshi Furuhara; Hideo Yoshida; Hidenobu Fujita, all of Hiroshima, Japan

[73] Assignee: Sharp Kabushiki Kaisha, Osaka, Japan

[21] Appl. No.: 730,174

[22] Filed: Jul. 16, 1991

[30] Foreign Application Priority Data

Jul. 18, 1990 [JP] Japan .................................. 2-191611
Feb. 19, 1991 [JP] Japan .................................. 3-24775

[51] Int. Cl.⁵ .............................................. G11B 15/18
[52] U.S. Cl. ..................................... 242/191; 242/201
[58] Field of Search ............... 242/191, 200, 201, 206; 360/74.1, 96.1, 96.3

[56] References Cited

U.S. PATENT DOCUMENTS

| | | | |
|---|---|---|---|
| 3,877,074 | 4/1975 | Güttinger | 242/201 X |
| 4,214,283 | 7/1980 | Fushimi et al. | 360/74.2 X |
| 4,238,808 | 12/1980 | Tomita | 242/191 X |
| 4,419,702 | 12/1983 | Tanaka | 360/74.1 X |
| 4,485,416 | 11/1984 | Walters | 242/191 X |
| 4,499,783 | 2/1985 | Takemasa | 360/74.1 X |
| 4,508,280 | 4/1985 | Hayosh et al. | 242/191 |
| 4,599,662 | 7/1986 | Iwasaki | 242/200 X |
| 4,630,148 | 12/1986 | Deutsch et al. | 242/191 X |
| 4,680,659 | 7/1987 | Imai | 242/201 X |
| 4,681,281 | 7/1987 | Aarts et al. | 360/96.3 X |
| 5,054,711 | 10/1991 | Kato | 360/96.3 X |

FOREIGN PATENT DOCUMENTS 2-006519 2/1990 Japan .

Primary Examiner—Daniel P. Stodola
Assistant Examiner—John P. Darling
Attorney, Agent, or Firm—David G. Conlin; Robert F. O'Connell

[57] ABSTRACT

A driving system of a magnetic recording/reproducing apparatus includes a motor, a pulley receiving rotation of the motor, a forward direction rotation body coaxially provided with the pulley, a reverse direction rotation body which always engages with the forward direction rotation body and rotates in the reverse direction, first and second reel stands which engage with respective reels of a cassette tape, and a moving rotation body which engages with the forward direction rotation body and the first reel stand in forward direction rotation, and engages with the reverse direction rotation body and the second reel stand in reverse direction rotation. A forward direction torque generating mechanism is provided between the forward direction rotation body and the moving rotation body and a reverse direction torque generating mechanism is provided between the reverse direction rotation body and the moving rotation body. The forward direction/reverse direction torque generating mechanisms include two friction transmitting members for generating torque suitable to constant speed run and high speed run, respectively. A reflection plate for detecting rotation of the first and second reel stands is fixed to either one of the forward direction rotation body or the reverse direction rotation body. A light emitting light receiving element for detecting rotation of the rotation plate is provided at a position facing to the reflection plate.

11 Claims, 15 Drawing Sheets

MAGNETIC RECORDING/REPRODUCING APPARATUS HAVING TORQUE GENERATOR GENERATING THE MOST APPROPRIATE TORQUE AND ROTATION DETECTING FUNCTION

BACKGROUND OF THE INVENTION

1. Field of the Invention

The present invention relates to structure of a magnetic recording/reproducing apparatus having a torque generating function providing the most appropriate torque required when cassette tape is running at a constant speed and at a high speed, respectively.

Furthermore, the present invention relates to structure of magnetic recording/reproducing apparatus having a function of determining a taking-up state and a taking-up finish state of cassette tape.

2. Description of the Background Art

Generally, in a magnetic recording/reproducing apparatus, when a tape is running at a constant speed in recording/reproducing, a reel stand taking up the tape is rotated with relatively low torque (in a compact cassette, generally about 35 g.cm), and when the tape is running at a high speed such as in fast forwarding/rewinding, the reel stand is rotated for taking up with relatively high torque (in a compact cassette, generally about 70-100 g.cm). Accordingly, a low torque generating mechanism and a high torque generating mechanism are individually provided in an apparatus, and the constant speed running and the high speed running of cassette tape have been implemented by transmitting torque generated by each mechanism to a predetermined reel stand.

In such a tape running mechanism, however, the number of parts is large and the loss of space is great, which makes it difficult to make apparatus smaller and to reduce manufacturing cost.

Magnetic recording/reproducing apparatus which solves such disadvantages include one disclosed in Japanese Utility Model Publication No. 2-6519. In the magnetic recording/reproducing apparatus, structure is disclosed in which generating means for low torque and generating means for high torque are provided on the same axis. FIG. 21 is a plan structural view of a magnetic recording/reproducing apparatus disclosed in the published application, and FIG. 22 is a cross sectional structural view of the reel stand driving mechanism shown in FIG. 21. A conventional magnetic recording/reproducing apparatus includes a driving motor 102, a pulley 122 to which the rotation force of the motor is transmitted through belt 120, a supply reel stand 103 and a take-up reel stand 104 engaging with cassette tape, and a reel stand driving mechanism for transmitting the rotation force transmitted to the pulley 122 to a predetermined supply reel stand 103 or take-up reel stand 104. The reel stand driving mechanism includes an intermediate gear 123 and a driving gear 125 provided on the same axis as pulley 122. A first sliding clutch 124 is interposed between pulley 122 and intermediate gear 123, and a second sliding clutch 126 is provided between intermediate gear 123 and driving gear 125. The driving gear 125 and the intermediate gear 123 are pressed onto pulley 122 by a spring 127 through the first and second sliding clutches 124, 126.

In operation, in the constant running of tape requiring low torque, the rotation force of pulley 122 is reduced to predetermined low torque through first sliding clutch 124 and second sliding clutch 126, and then transmitted to the take-up reel stand 104 side by driving gear 125. When the tape is running at a high speed requiring high torque, the rotation force of pulley 122 is slightly reduced and transmitted to an intermediate gear 123 through first sliding clutch 124, and furthermore transmitted to take-up reel stand 104 or supply reel stand 103 through a pivoting gear 129. The pivoting gear 129 then simultaneously engages with intermediate gear 123 and driving gear 125. The second sliding clutch 126 is thus fixed not to function.

A conventional magnetic recording/reproducing apparatus, however, has the following problems.

(1) Firstly, it is difficult to set a value of high torque extracted from pivoting gear 129 and a value of low torque extracted from driving gear 125 at the most appropriate values, respectively. This comes from the structure in which first sliding clutch 124 and second sliding clutch 126 are pressed by a single compression spring 127. That is to say, in first and second sliding clutches 124 and 126, felt which is generally formed of wool or the like is sandwiched between two rotating bodies, which is pressed by a spring in one direction to transmit desired torque by the sliding friction. Accordingly, the transmitted torque is affected by a friction factor between the two rotating bodies and the felt, and the compressive force supplied to the two rotating bodies. The friction factor between the two rotating bodies and the felt has a large variety, which is largely affected by the environments, especially by humidity. Accordingly, it is necessary to precisely set the load of the compression spring in setting transmission torque. However, it is difficult when compressing two sliding clutches 124 and 126 with a single compression spring 127 as described above to make setting so that the most appropriate compressive force is applied to each. Accordingly, in a conventional structure, it has been difficult to set values of both of high and low torque at the most appropriate values.

(2) Secondly, in order to obtain high torque, it must be extracted through first sliding clutch 124 from pulley 122 through pivoting gear 129 which simultaneously meshes with intermediate gear 123 and driving gear 125. Pivoting gear 129 must be simultaneously brought into mesh with intermediate gear 123 and driving gear 125 from a separated condition. If intermediate gear 123 and driving gear 125 are in alignment, the mesh can be smoothly made, but if they are not in alignment, pivoting gear 129 must be pressed so that either one of the gears is relatively moved to bring tooth surfaces of the two gears in alignment. However, second sliding clutch 126 having friction force is interposed between intermediate gear 123 and driving gear 125. Accordingly, for bringing pivoting gear 129 into mesh with both gears, it must be pressed with force which overcomes the friction force of second sliding clutch 126. Accordingly, if it is made to obtain the pivoting force for pivoting gear 129 utilizing the rotation force from the driving motor, the motor is required for high driving force, resulting in an increase in cost. Also, when the mesh is not made smoothly because of such conditions as described above when pivoting gear 129 is brought into mesh, abnormal sounds such as gear noise may occur.

A conventional magnetic recording/reproducing apparatus has an auto stop function of detecting a tape take up finish state of cassette tape and automatically stopping a motor which drives reels. FIG. 23 is a plan structural schematic view showing structure of a tape driving portion of a conventional magnetic recording-/reproducing apparatus, FIG. 24 is a sectional structure diagram taking along the cut line E—E in FIG. 23, and FIG. 25 is a plan structure schematic view taking along the arrow F—F of FIG. 24. FIG. 23 and FIG. 25 are a top view and a bottom view with respect to each other. Referring to FIGS. 23 through 25, with a cassette 75 attached, it engages with two reel stands 76 and 77. Magnetic tape of cassette 75 is provided so that it passes between one capstan 78 and a pinch roller 80 and between the other capstan 79 and pinch roller 81. The shown magnetic recording/reproducing apparatus has a driving mechanism capable of constant running in a forward direction and constant running in a reverse direction. In running at a constant speed in the forward direction, the tape is sandwiched and held between capstan 78 and pinch roller 80, which is fed in a normal direction "a" with take up rotation operation of a FOR reel stand 76 in the normal direction X and the constant speed rotation operation of capstan 78 and pinch roller 80.

In reverse direction constant speed running, the magnetic tape is sandwiched and held between capstan 79 and pinch roller 81, which is fed in the reverse direction "b" with the reverse direction rotation Y of a REV reel stand 77 and the constant speed reverse direction rotation of capstan 79 and pinch roller 81.

A conventional magnetic recording/reproducing apparatus has an automatic stop mechanism for automatically stopping operation of the apparatus when a terminal end of the tape in run is reached. The detecting mechanism for detecting the terminal end of tape has structure as described below. First, a reflection panel 70 is provided on the same axis as that for FOR reel stand 76. As shown in FIG. 25, in reflection panel 70, portions with high optical reflectance ratio and portions with low reflectance are alternately arranged for every constant angle around the rotation axis. A light emitting light receiving element 71 is provided at a position facing rotation panel 70. Furthermore, a rotation detecting device for electrically detecting rotation operation of rotation panel 70 is connected to light emitting light receiving element 71.

FIG. 26 is a schematic diagram showing positional relationship between rotation panel 70 and light emitting light receiving element 71, and FIG. 27 is a block diagram for describing a rotation detecting device for detecting the rotation movement of rotation panel 70. Light emitting light receiving element 71 emits light to the rotating panel and receives light reflected from reflection panel 70 to convert its magnitude into an electrical signal. A frequency/voltage converter 72 converts the frequency of a periodical signal supplied from light emitting light receiving element 71 into voltage to output an output voltage $v_1$. A comparator 73 receives the output voltage $v_1$ from frequency/voltage converter 72, compares it with an output voltage $v_0$ which is outputted from frequency/voltage converter 72 in the case where the frequency of a signal outputted from light emitting light receiving element 71 is 0, and if $v_1 - v_0 < 0$, outputs High, and if $v_1 - v_0 = 0$, outputs Low. Furthermore, a tape take up determining device 74 receives the output of comparator 73, and makes a determination that the tape is being taken up if the output is High and that taking up of the tape is finished if the output is Low. Then, when a determination is made by tape take up determining device 74 that the tape has been taken up, the rotation of the driving motor is stopped.

However, in such a mechanism for detecting tape take up states as described above, there has been a problem that a case may occur in which the automatic stop mechanism does not operate in spite of a fact that the tape run should be stopped. It is described referring to FIGS. 28 and 29. FIG. 28 is a schematic diagram of the normal direction tape drive indicating operation conditions of the tape driving system in the normal direction constant run and FIG. 29 is a schematic diagram of the reverse direction tape drive.

First, referring to FIG. 28, in the forward direction constant run, the tape is fed from the REV reel stand 77 side to the FOR reel stand 76 side at a constant speed by FOR reel stand 76 always rotating in the X direction, capstan 78 feeding magnetic tape in the same direction and pinch roller 80, which is taken up by the reel of cassette tape 75 engaging with FOR reel stand 76. Imagine a case where the rotation of FOR reel stand 76 is stopped due to some abnormality in the forward direction constant speed run. In this case, capstan 78 continues to feed the tape in the forward direction in order to maintain the rotational movement. On the other hand, when the rotation of FOR reel stand 76 is stopped, the rotation of reflection panel 70 coaxially provided is also stopped. Then, the above-described rotation detecting means determines that the tape has been taken up, and then the automatic stop mechanism operates to stop the driving motor. The rotation operation of capstan 78 thus stops, too.

Referring to FIG. 29, however, in the reverse direction constant speed run, a normal stopping operation is not carried out as in the forward direction run. That is to say, in the reverse direction constant speed run, REV reel stand 77 rotates in the Y direction and the tape is fed at a constant speed in the same direction by capstan 79 and pinch roller 81. The magnetic tape is thus taken up at a constant speed from the reel side engaging with FOR reel stand 76 to the reel side engaging with REV reel stand 77.

Imagine that the rotation of REV reel stand 77 is stopped due to some abnormality. Capstan 79 and pinch roller 81 maintains the rotational movement even when the rotation of REV reel stand 77 stops, to continuously forwarding the magnetic tape. Then, FOR reel stand 76 also maintains the rotation movement with the tape feeding operation of the capstan 79 and pinch roller 81. Accordingly, reflection panel 70 provided in FOR reel stand 76 still maintains the rotating state. Therefore, the rotation detecting device makes a determination that the tape is being taken up not to operate the automatic stop mechanism. Accordingly, the magnetic tape fed by capstan 79 and pinch roller 81 is continuously fed out toward the reel engaging with REV reel stand 77, with the result that the magnetic tape is continuously pulled out from cassette tape 75. In this case, a problem occurs in which the magnetic tape is damaged to be unusable.

SUMMARY OF THE INVENTION

It is an object of the present invention to provide a magnetic recording/reproducing apparatus having a torque generating mechanism for generating the most appropriate torque for driving a tape according to respective operation modes of a cassette tape.

It is another object of the present invention to miniaturize a torque generating mechanism of a magnetic recording/reproducing apparatus.

Furthermore, it is still another object of the present invention to provide a magnetic recording/reproducing apparatus provided with a rotation detecting mechanism which detects rotational abnormality when tape reels are running in forward/reverse directions and stops the tape running.

In one aspect of the present invention, a magnetic recording/reproducing apparatus includes a pair of first and second reel members engaging with cassette tape for taking up the magnetic tape of the cassette tape in a predetermined direction, a motor producing rotation force, a forward direction torque generating mechanism linked to the motor, a reverse direction torque generating mechanism engaging with the forward direction torque generating mechanism, and a rotation force transmitting mechanism intervening among the forward direction torque generating mechanism, the reverse direction torque generating mechanism, and the first and second reel members.

The forward direction torque generating mechanism includes a pulley for receiving the rotation force from the motor, a first rotating body provided coaxially with the pulley, first friction transmitting mechanism intervening between the pulley and the first rotating body for reducing the rotation force which the pulley receives to a predetermined value and transmitting it to the first rotating body, a second rotating body provided coaxially with the pulley, and second friction transmitting mechanism intervening between the first rotating body and the second rotating body for further reducing the rotating force of the first rotating body and transmitting the force to the second rotating body.

The reverse direction torque generating mechanism includes a fifth rotating body which engages with the first rotating body of the forward direction torque generating mechanism and rotates in the opposite direction to the first rotating body.

The rotation force transmitting mechanism includes a third rotating body which engages simultaneously with the second rotating body of the forward direction torque generating mechanism and the first reel member in the constant speed run of a recording/reproducing mode of cassette tape for transmitting the rotation force of the second rotating body to the first reel member, and a fourth rotating body which simultaneously engages with the first rotating body of the forward direction torque generating mechanism and the first reel member in high speed run of a fast forwarding mode of the cassette tape to transmit the rotation force of the first rotation body to the first reel member, and in the high speed run of the rewinding mode, engages simultaneously with the fifth rotating body of the reverse direction torque generating mechanism and the second reel member to transmit the rotation force of the fifth rotating body to the second reel member.

In the magnetic recording/reproducing apparatus, a first rotating body generating high torque and a second rotating body producing low torque are independently provided wherein rotation force is transmitted through a fourth and third rotating bodies which engage with the first and second rotating bodies, respectively. The rotation force set at a predetermined high torque value by the first friction transmitting mechanism is transmitted from the first rotating body to the fourth rotating body. Rotating force set at a predetermined low torque value by the second friction transmitting mechanism is transmitted from the second rotating body to the third rotating body. The transmission of rotation force is carried out by engagement of each single pair of rotation bodies, so that it is smooth and does not produce noise.

In the second aspect of the present invention, a magnetic recording/reproducing apparatus includes a pair of first and second reel members which engage with cassette tape for taking up magnetic tape of the cassette tape in a predetermined direction, a motor producing rotation force, forward direction torque generating mechanism linking to the motor, reverse direction torque generating mechanism linking to the forward direction torque generating mechanisms, and a rotation force transmitting mechanism linking to the forward direction and reverse direction torque generating mechanisms.

The forward direction torque generating mechanism includes a pulley receiving the rotation force from the motor, a first rotating body provided coaxially with the pulley, a first friction transmitting mechanism intervening between the pulley and the first rotating body for reducing the rotating force received by the pulley to a predetermined value and transmitting the force to the first rotating body, a second rotating body provided coaxially with the pulley, and a second friction transmitting mechanism intervening between the first rotating body and the second rotating body for further reducing the rotation force of the first rotating body and transmitting the force to the second rotating body.

The reverse direction torque generating mechanism includes a fifth rotating body engaging with the first rotating body of the forward direction torque generating mechanism and rotates in the opposite direction to the first rotating body, and a sixth rotating body which is provided on the same axis as the fifth rotating body, engages with the second rotating body of the forward direction torque generating mechanism and rotates in the opposite direction to the second rotating body.

The rotation force transmitting mechanism includes a third rotating body which engages simultaneously with the second rotating body of the forward direction torque generating mechanism and the first reel member in the forward direction constant speed run of the cassette tape for transmitting the rotation force of the second rotating body to the first reel member, and in the reverse direction constant speed run of the cassette tape, engages simultaneously with the sixth rotating body of the reverse direction torque generating mechanism and the second reel member for transmitting the rotation force of the sixth rotating body to the second reel member, and a fourth rotating body which, in the forward direction high speed run of the cassette tape, simultaneously engages with the first rotating body of the forward direction torque generating mechanism and the first reel member for transmitting the rotation force of the first rotating body to the first reel member, and in the reverse direction high speed run simultaneously engages with the fifth rotating body of the reverse direction torque generating mechanism and the second reel member for transmitting the rotation force of the fifth rotating body to the second reel member.

In the above-described invention, the sixth rotating body which engages with the first rotating body and rotates in the opposite direction is provided in the reverse direction torque generating mechanism to enable the so-called automatic reverse mechanism capable of play in the reverse direction running of tape.

In the third aspect of the present invention, a magnetic recording/reproducing apparatus has recording- /reproducing modes in which provided cassette tape runs at a constant speed in a forward direction and a reverse direction. It has a pair of first and second reel members engaging with the cassette tape for taking up magnetic tape of the cassette tape in a predetermined direction, a motor producing rotation force, and a pulley receiving the rotation force from the motor. Furthermore, a second rotating body which receives the rotation force of the pulley to rotate is provided on the same axis as that of the pulley. A sixth rotating body which rotates in the opposite direction to the second rotating body engages with the second rotating body. Furthermore, the magnetic recording/reproducing apparatus has a third rotating body. The third rotating body simultaneously engages with the second rotating body and the first reel member in the forward direction running of the cassette tape to transmit the rotation force of the second rotating body to the first reel member. It simultaneously engages with the sixth rotating body and the second reel member to transmit the rotation force of the sixth rotating body to the second reel member when the tape of the cassette tape is running in the reverse direction. Also, it is provided with a rotation detecting device having a rotation detecting body which rotates engaging with either one of the second rotating body or the sixth rotating body and a detecting device for electrically detecting the rotation movement of the rotation detecting body.

In the magnetic recording/reproducing apparatus according to the present invention, the rotation detecting body is provided so as to rotate engaging with either one of the second rotating body or the sixth rotating body. The second rotating body is linked to the first reel member with the third rotating body intervening therebetween when the tape is running in the forward direction. Accordingly, when the first reel member stops due to some trouble, the second rotating body also stops. In the reverse direction running of the cassette tape, it is linked to the second reel member through the sixth rotating body and the third rotating body. Accordingly, when the second reel member stops due to some trouble, the second rotating body also stops. Accordingly, when the rotation detecting body is attached to the second rotating body, the second rotating body and the rotation detecting body stop to determine that the cassette tape is in a standstill state with abnormal stop of the first and second reel members in both of the forward direction running and the reverse direction running.

Also when the rotation detecting body is attached to the sixth rotating body, the same function is effected. That is to say, in the forward direction run, the sixth rotation body engages with the second rotation body which rotates being linked to the first reel member with the third rotating body intervening therebetween. Accordingly, when the first reel member stops, the standstill state is transmitted through the third rotating body and the second rotating body. In the reverse direction run, the rotating state is transmitted through the third rotating body with stop of the second reel member since it is linked to the second reel member with the third rotating body intervening therebetween. Accordingly, in both of the cases of the forward direction running and the reverse direction running, the sixth rotating body stops with abnormal stop of the first and second reel members. Accordingly, the rotation detecting body attached to the sixth rotation body also stops to determine a standstill state of the cassette tape.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A magnetic recording/reproducing apparatus according to the present invention has a so-called automatic reverse mechanism. It can implement a forward direction recording/playback mode (a FP mode: a forward play state), a forward direction fast forwarding mode (a FF mode: a fast forward state), a reverse direction recording/playback mode (a RP mode: a reverse play state) and a rewinding mode (REW mode: a rewinding state).

Figure 5:
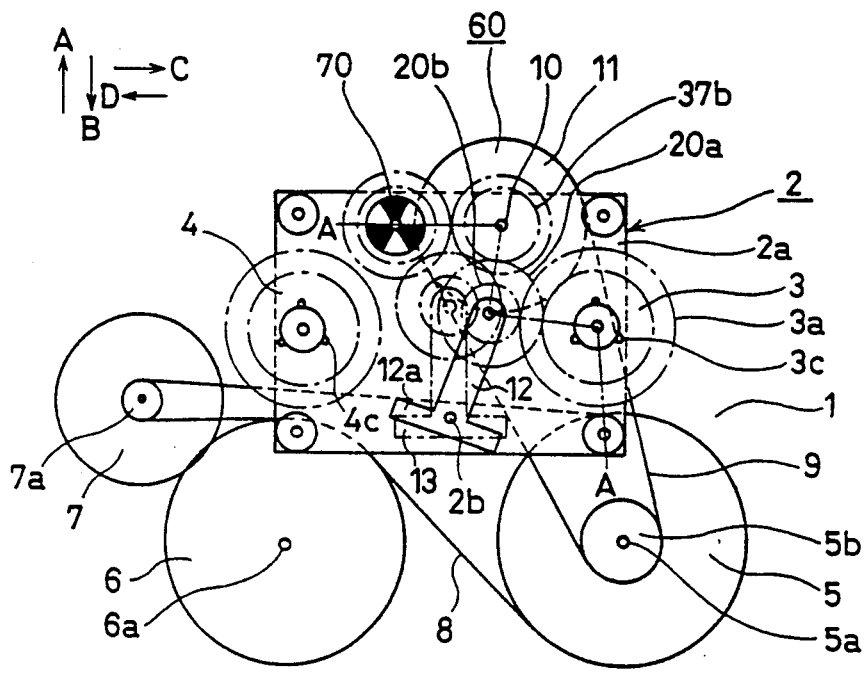
FIG. 5 is a plan structural view in a forward play mode.

First, referring to FIG. 5, the magnetic recording/reproducing apparatus has its main parts provided on a main chassis 1. A drive block 2 has rotating parts and the like on a drive block plate 2a and is attached to the main chassis 1 with screws.

A motor 7, a FOR fly wheel 5 supported by a FOR capstan axis 5a, and a REV fly wheel 6 supported by a REV capstan axis 6a are arranged on main chassis 1. A fly belt 8 is suspended over a motor pulley 7a which is affixed to an output axis of motor 7, a FOR fly wheel 5 and a REV fly wheel 6. Motor 7 always rotates in a counterclockwise direction. FOR capstan axis 5a and FOR fly wheel 5 rotate in a counterclockwise direction and a REW capstan axis 6a and REV fly wheel 6 rotate in a clockwise direction.

A pulley 11 supported by a drive axis 10 is rotatably provided on the drive block plate 2a of drive block 2. A drive belt 9 is suspended over pulley 11 and a fly pulley 5b of FOR fly wheel 5. Pulley 11 thus always rotates in the counterclockwise direction. Furthermore, a substantially T-shaped play idler lever 12 attached to an axis 2b and an also substantially T-shaped FF/REW idler lever 13 are coaxially provided on drive block plate 2a. The play idler lever 12 and the FF/REW idler lever 13 are provided pivotably around axis 2b.

Figure 1:
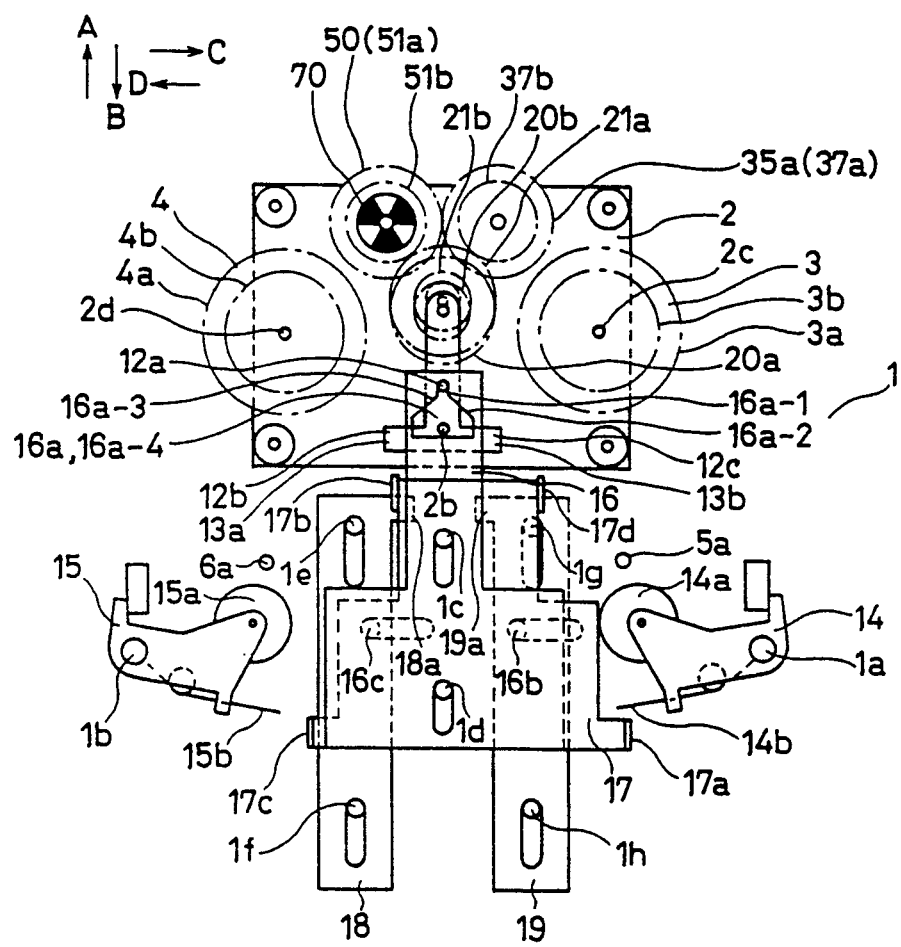
FIG. 1 is a plan structure diagram of a rotation transmitting portion and a scanning portion in a standstill mode of a magnetic recording/reproducing apparatus of one embodiment of the present invention.

Next, mainly referring to FIG. 1, a FOR pinch roller block 14 and a REV pinch roller block 15 are symmetrically provided on main chassis 1. The FOR pinch roller block 14 is provided pivotably about axis 1a and the REV pinch roller block 15 is provided pivotably about axis 1b. A head plate 16 is guided by axes 1c and 1d provided on main chassis 1 to be reciprocatable in the direction of the arrows A and B, which is always energized in the arrow B direction by a spring (not shown). A magnetic head (not shown) is provided on head plate 16, which operates to make an appropriate contact with magnetic tape of cassette tape when head plate 16 moves in the arrow A direction resistant against the spring force by the rotation of a first cam (not shown). The axes 1c and 1d are provided on a perpendicular bisector of a segment connecting a rotation center axis 2c of FOR reel stand 3 and a rotation central axis 2d of REV reel stand 4. A guide hole 16a is provided at a tip of head plate 16. Guide hole 16a includes long hole 16a-1 forbidding movement of a pin 12a, which is provided in play idler lever 12, in the directions of arrows C and D in the figure, oblique sides 16a-2, 16a-3 and an opening 16a-4 which enables movement of pin 12a in the directions of the arrows C and D.

Reverse plate 17 is guided by axes 16b and 16c provided in head plate 16 to be reciprocatable in the directions of the arrows C and D. The reverse plate 17 is always energized by a spring (not shown) in the direction of the arrow C, which is movable in the arrow D direction with operation of a second cam (not shown). As shown in FIG. 1, in a standstill state, reverse plate 17 is positioned on the arrow C direction side.

Next, a switching mechanism to the FF/REW mode will be described. An FF lever 18 for switch to the FF mode and an REW lever 19 for switch to the REW mode are guided for reciprocating movement in directions of the arrows A and B, respectively by axes 1e, 1f and axes 1g and 1h provided in main chassis 1. Both of the levers 18 and 19 are energized in the arrow B direction by a spring (not shown). The FF lever 18 and REW lever 19 are provided symmetrically about a perpendicular bisector of a segment connecting rotation centers of both reel stands 3 and 4. FF lever 18 has a protruding portion 18a in the direction of the arrow A and similarly REW 19 has a protruding portion 19a. The protruding portion 18a of FF lever 18 faces a left arm 13a of FF/REW idler lever 13 and the protruding portion 19a of REW lever 19 faces a right arm 13b of FF/REW idler lever 13. Furthermore, FF operation parts and REW operation parts (not shown) are provided corresponding to each other on the arrow B side of FF lever 18 and REW lever 19.

FF/REW idler lever 13 is provided pivotably on axis 2b provided on drive block plate 2a. A lever portion of FF/REW idler lever 13 has a stepped shape coupled by coupling portion 13c. A coil portion of FF/REW torsion spring 22 is put around the outer periphery surface 13d of a baring portion of axis 2b. Both arms of torsion spring 22 sandwich and hold coupling portion 13c of FF/REW idler lever 13. Protruding portion 2i protruding from a surface of drive block plate 2a exists between coupling portion 13c of FF/REW idler lever 13 and the outer periphery surface 13d of the bearing portion. The width of coupling portion 13c of FF/REW idler lever 13 and the width of the protruding portion 2i of drive block plate 2a are made equal to each other. By such structure, FF/REW idler lever 13 is maintained at a position allowing no pivoting neither in clockwise nor counterclockwise direction by the effect of torsion spring 22.

Figure 3:
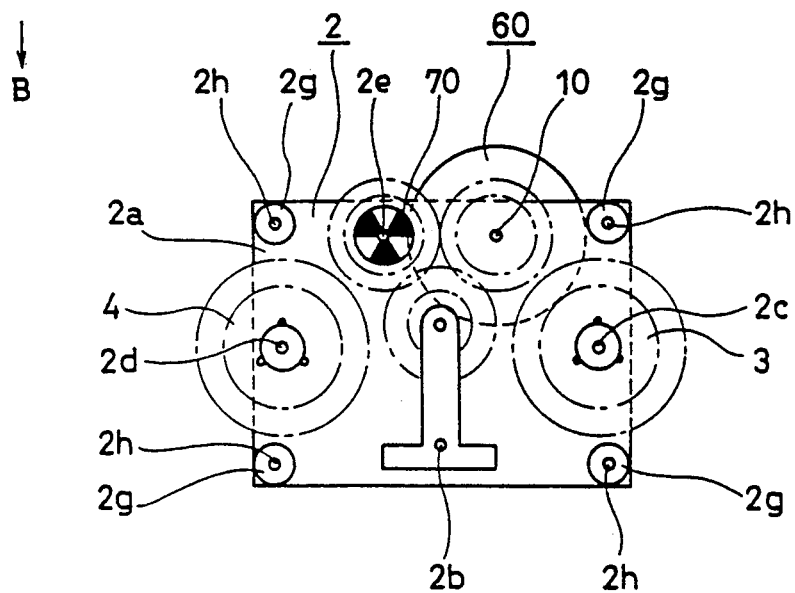
FIG. 3 is a plan structural view of the drive block.
Figure 4:
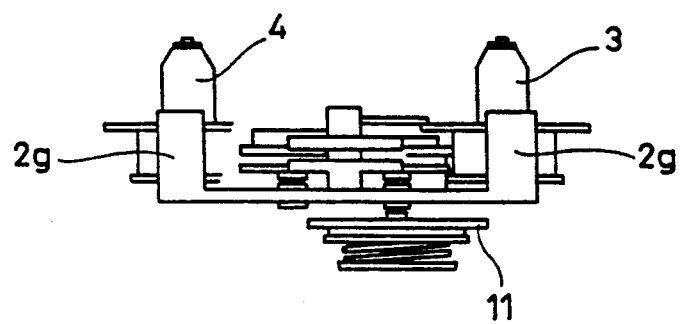
FIG. 4 is a front structural view of FIG. 3.
Figure 6:
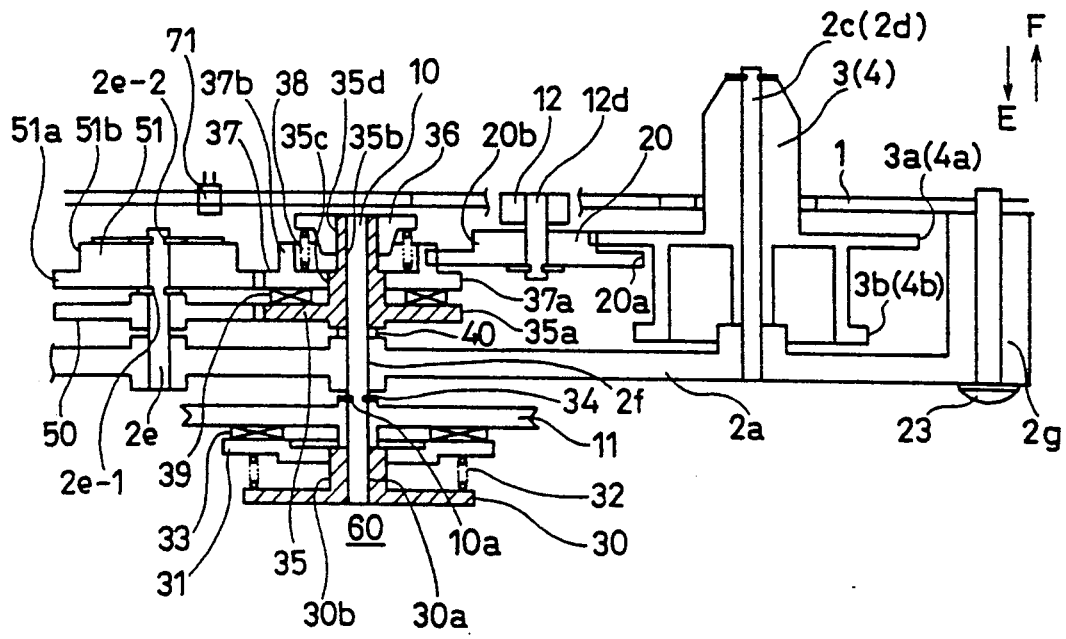
FIG. 6 is a cross sectional structural diagram taken along the cut line A—A in FIG. 5.

Next, the rotation transmitting system is described. In the rotation transmitting system, all the rotation parts except the motor, the fly wheel, the pinch roller belt are provided as a block on drive block 2. Referring to FIGS. 3, 4 and 6, drive block plate 2a of drive block 2 has an integrally formed boss 2g having a through hole 2h for a screw for attachment to main chassis 1. Furthermore, axis 2b for play idler lever 12 and FF/REW idler lever 13, axis 2c for FOR reel stand 3, axis 2d for REV reel stand 4 and axis 2e for a reverse gear and a REW gear are provided on drive block plate 2a and furthermore a bearing of drive axis 10 is provided thereon. The pitch between axis 2c of FOR reel stand 3 and axis 2d of REV reel stand 4 is 42.5 mm, for example, which coincides with the reel pitch of a compact cassette tape. The axis 2b is equally distant from the rotation central axes 2c and 2d of both reel stands 3 and 4, and positioned on the arrow B side from the bearing of drive axis 10. Furthermore, axis 2e for the reverse gear and the bearing portion of drive axis 10 are provided symmetrically about the perpendicular bisector of a line connecting rotation central axes 2c and 2d of FOR reel stand 3 and REW reel stand 4. Drive block 2 is fixed with screws at a predetermined position of main chassis 1 through bosses 2g. Drive block 2 is provided so that both reel axes 2c and 2d are arranged at predetermined set positions for both capstan axes 5a and 6a. For example, the distance between the axis line of both reel axes 2c and 2d and the axis line of both capstan axes 5a and 6a is 31.3 mm.

Referring to FIGS. 3 and 6, friction block 60 will be described. Drive axis 10 is rotatably inserted into bearing 2f provided in drive block plate 2a. Respective rotating parts are provided on a portion protruding downwards (the direction of the arrow E) and at a portion protruding upwards of the drive axis 10 (the direction of the arrow F) from drive block plate 2a.

First, at a lower portion of drive axis 10, a spring bearing 30 is put with pressure and fixed at a lower portion of drive axis 10. The lower end surfaces of spring bearing 30 and drive axis 10 coincide with each other. Then, drive axis 10 and spring bearing 30 integrally rotate. A first compression spring 32 is provided on an upper surface of a flange of spring bearing 30. A friction plate 31 pushes down first compression spring 32 upon the upper surface of spring bearing 30, and a central portion of friction plate 31 is attached movably upwards and downwards to outer peripheral surface 30b of pressure insert portion 30a of spring bearing 30. First frictional member 33 is provided on an upper surface of friction plate 31, and pulley 11 is further attached on the upper surface thereof. After attaching pulley 11 on drive axis 10, a stop washer 34 is mounted to a groove 10a provided in drive axis 10. A detent (not shown) is provided between friction panel 31 and spring bearing 30, and friction panel 31 and spring bearing 30 integrally rotate. The rotation force is transmitted from motor 7 to pulley 11 by drive belt 9. The rotation of pulley 11 is transmitted to friction panel 31, spring bearing 30 and rotation axis 10 through the first friction member 33. The load of the first compression spring 32 is supported between spring bearing 30 and pulley 11 supported by stop washer 34. Then, a first maximum transmission torque (high torque) is set by first friction member 33 formed of felt such as wool and first compression spring 32. The first maximum transmission torque is appropriate torque to run tape at a high speed, which is 80 g.cm, for example. If it is assumed that torque transmitted from motor 7 to pulley 11 is 100 g.cm, torque of 20 g.cm is canceled by slip between pulley 11 and friction panel 31. The above-described structure is referred to as the first friction mechanism. The first maximum transmission torque set by the first friction mechanism is transmitted to the upper side of bearing 2f by drive axis 10.

Next, the second friction mechanism located on the upper side of bearing 2f will be described. A flat washer 40 (product name: Polyslider Washer) formed of low friction member is attached to drive axis 10 upwardly protruding from bearing 2f of drive block plate 2a. Next, FF gear 35 is pressed in around drive axis 10. The FF gear 35 (a first rotating body) is provided so that the upper surface thereof and the upper end portion of drive axis 10 coincide with each other. FF gear 35 rotates integrally with drive axis 10. Subsequently, the clearance in the thrust direction of friction block 60 is adjusted. The clearance in the thrust direction occurs because of the difference between the whole length of drive axis 10 and the whole length of FF gear 35, bearing 2f, washers 40, 34, pulley 11 and spring bearing 30 attached to drive axis 10. The clearance in the thrust direction is adjusted to about 0.05-0.2 mm, for example. After adjusting the clearance in the thrust direction, second frictional member 39 is provided on an upper surface of FF gear 35. Furthermore, a play gear 37 (a second rotating body) is provided on an upper surface of the second frictional member 39. Play gear 37 has a gear portion 37a with a large diameter and a gear portion 37b with a small diameter. A second compression spring 38 is provided in an upper surface concave portion of play gear 37, and a spring bearing plate 36 is pressed in and fixed around outer peripheral surface 35d of the press-in portion 35b of FF gear 35 thereupon. With such structure, the second friction mechanism is configured. FF gear 35 rotates integrally with drive axis 10, and play gear 37 rotates with a predetermined rotating force through the second frictional member 39. The load of second compression spring 38 is supported by spring bearing plate 36 and FF gear 35. Then, the second maximum transmission torque (low torque) is set by the second frictional member 39 and the second compression spring 38. The second maximum transmission torque has a value lower than that of the first maximum transmission torque, in which the torque is set to a value necessary for running tape at a constant speed. The value is 35 g.cm, for example. If the maximum torque of the first friction mechanism is 80 g.cm as described above, then the torque is reduced by 45 g.cm by the second friction mechanism.

In this way, the first and second friction mechanisms are provided coaxially on drive axis 10. And they are provided separatedly above and below bearing 2f and drive block plate 2a interposed therebetween. Accordingly, the diversions of respective rotating bodies do not affect with each other.

In summary, in operation of the first and second friction mechanisms, the rotation force transmitted from motor 7 to pulley 11 is limited to the first torque suitable to run tape at a high speed by the first friction mechanism, and the first torque is transmitted to FF gear 35 through friction panel 31, spring bearing 30 and drive axis 10. Predetermined high torque can be obtained by extracting the first torque from FF gear 35. Next, the rotation force transmitted to FF gear 35 is limited to the second torque suitable to run tape at a constant speed by the second friction mechanism and transmitted to play gear 37. Accordingly, predetermined low torque can be obtained by extracting the rotation force from play gear 37.

FF gear 35 which is a drive source of the high torque and play gear 37 which is a drive source of the low torque are provided adjacent each other with extremely thin second friction member 39 therebetween. The diameters of FF gear 35 and play gear 37 are equal to each other. By such structure, the entirety of friction block 60 is made compact. Accordingly, the rotation transmitting system engaging with the friction block 60 is also made compact.

Next, the structure of the reel portion will be described. FOR reel stand 3 and REV reel stand 4 have blade portions 3c and 4c engaging with reel hubs of cassette tape to take up the tape. They are rotatably attached to axes 2c and 2d provided in drive block plate 2a. In FOR reel stand 3 and REV reel stand 4, respective large-diameter gears 3a and 4a and small-diameter gears 3b and 4b are coaxially and integrally provided. Both reel stands 3 and 4 are attached to axes 2c and 2d with appropriate clearance with respect to drive block plate 2a by stop washers inserted into grooves provided on axes 2c and 2d. Furthermore, both reel stands 3 and 4 are forbidden to move along axes 2c and 2d. Large-diameter gears 3a and 4a of the reel stands mesh with small-diameter gear 20b of play idler gear 20 (the third rotating body) to run tape at a constant speed, and the small-diameter gears 3b and 4b mesh with large-diameter gear 21a of FF/REW idler gear 21 (the fourth rotating body) to run tape at a high speed.

Next, the mechanism related to reverse direction running of the tape is described. The mechanism includes REW gear 50 (the fifth rotating body) and reverse gear 51 (the sixth rotating body). An axis 2e is provided in a standing manner at a predetermined position of drive block plate 2a. REW gear 50 is attached rotatably to axis 2e. After putting REW gear 50 through axis 2e, a stop washer is incorporated in the groove provided in axis 2e, and REW gear 50 is restrained to move up and downwards with permitted appropriate clearance in the longitudinal direction of axis 2e. Furthermore, reverse gear 51 is inserted through axis 2e and a stop washer is incorporated at the upper end of axis 2e. Reverse gear 51 is also permitted to have appropriate clearance in the axis direction of axis 2e. REW gear 50 and the large-diameter portion 51a of reverse gear 51 have almost the same diameter. REW gear 50 always mesh with FF gear 35 and large-diameter gear 51a of reverse gear 51 always mesh with the large-diameter gear 37a of play gear 37. REW gear 50 thus rotates in the opposite direction to that of FF gear 35 and reverse gear 51 rotates in the opposite direction to the direction of rotation of play gear 37.

Figure 2:
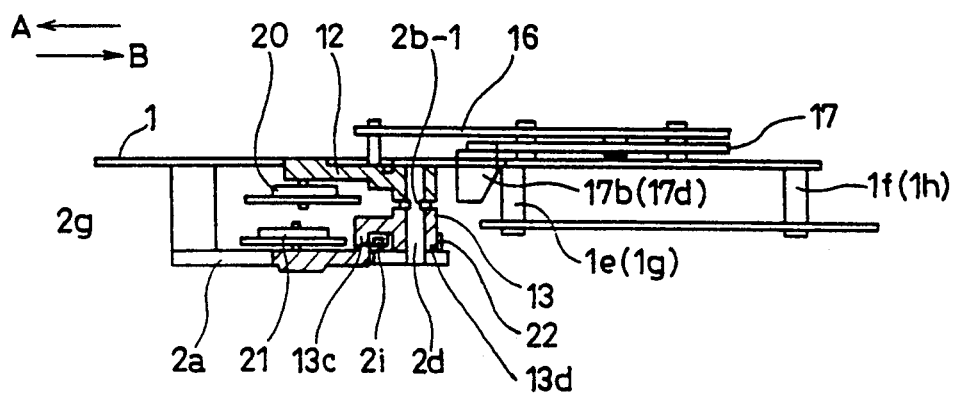
FIG. 2 is a cross sectional structural view of a main portion in FIG. 1.

Furthermore, the mechanism of play idler lever 12 and FF/REW idler lever 13 is described. Referring to FIGS. 2 and 6, FF/REW idler lever 13 is pivotably inserted through axis 2b provided in drive block plate 2a together with FF/REW torsion spring 22. Idler lever 13 secures appropriate clearance in the thrust direction with a stop washer attached in groove 2b-1 provided in axis 2b, which is also restrained its up and down movement. Furthermore, play idler lever 12 is attached to axis 2b. Play idler lever 12 is provided with a snap hit portion (having structure in which a stopper portion is provided at a tip portion of an elastic portion. Not shown). When it is pushed down to a predetermined position, the snap hit portion is locked to drive lock plate 2a. With drive block 2 attached to main chassis 1, upwards movement of play idler lever 12 is restrained by the lower surface of main chassis 1. At tip portions of play idler lever 12 and FF/REW idler lever 13, play idler gear 20 and FF/REW idler gear 21 having two step gears are rotatably attached through respective rotation axes 12d and 13e. Idler gear 20 and FF/REW idler gear 21 are restrained to move up and down while maintaining appropriate clearance in the thrust direction by the stop washer with respect to respective rotation axes 12d and 13e. The pivoting centers of play idler lever 12 and FF/REW idler lever 13 are positioned at axis 2b as described above, wherein the distance $l_1$ from the pivoting center to the rotation center of play idler gear 20 and the distance $l_2$ from the pivoting center to the rotating center of FF/REW idler gear 21 are set almost equal to each other. However, strictly speaking, $l_2$ is larger than $l_1$. The large-diameter gear 20a of play idler gear 20 and the large-diameter gear 21a of FF/REW idler gear 21 are made to have the same diameter.

Next, the positional relationship in the height direction of respective gears will be described. Large-diameter gear 21a of FF/REW idler gear 21 is set at the same height as small-diameter gear 3b of FOR reel stand 3 and small-diameter gear 4b of REW reel stand 4. Small-diameter gear 21b of FF/REW idler gear 21 is provided at the height same as FF gear 35 and REW gear 50 of friction block 60. On the other hand, large-diameter gear 20a of play idler lever 20 is set at the height same as small-diameter gear 37b of play gear 37 and small-diameter gear 51b of reverse gear 51. Small-diameter gear 20b of play idler gear 20 is set at the same height as large-diameter gear 3a of FOR reel stand 3 and large-diameter gear 4a of REW reel stand 4.

Figure 25:
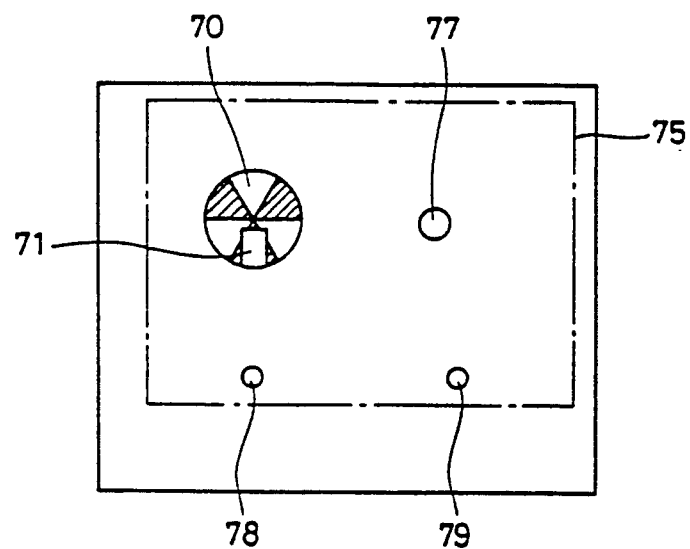
FIG. 25 is a plan structural view in the direction taking along the arrow F—F in FIG. 18.
Figure 26:
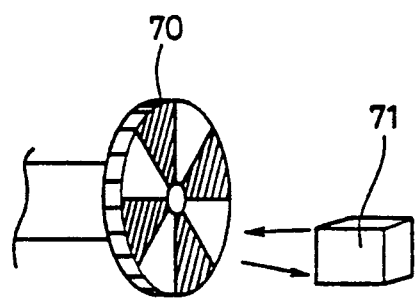
FIG. 26 is a structural view indicating positional relationship of a rotation plate and a light emitting light receiving element of a take up detecting mechanism.
Figure 27:
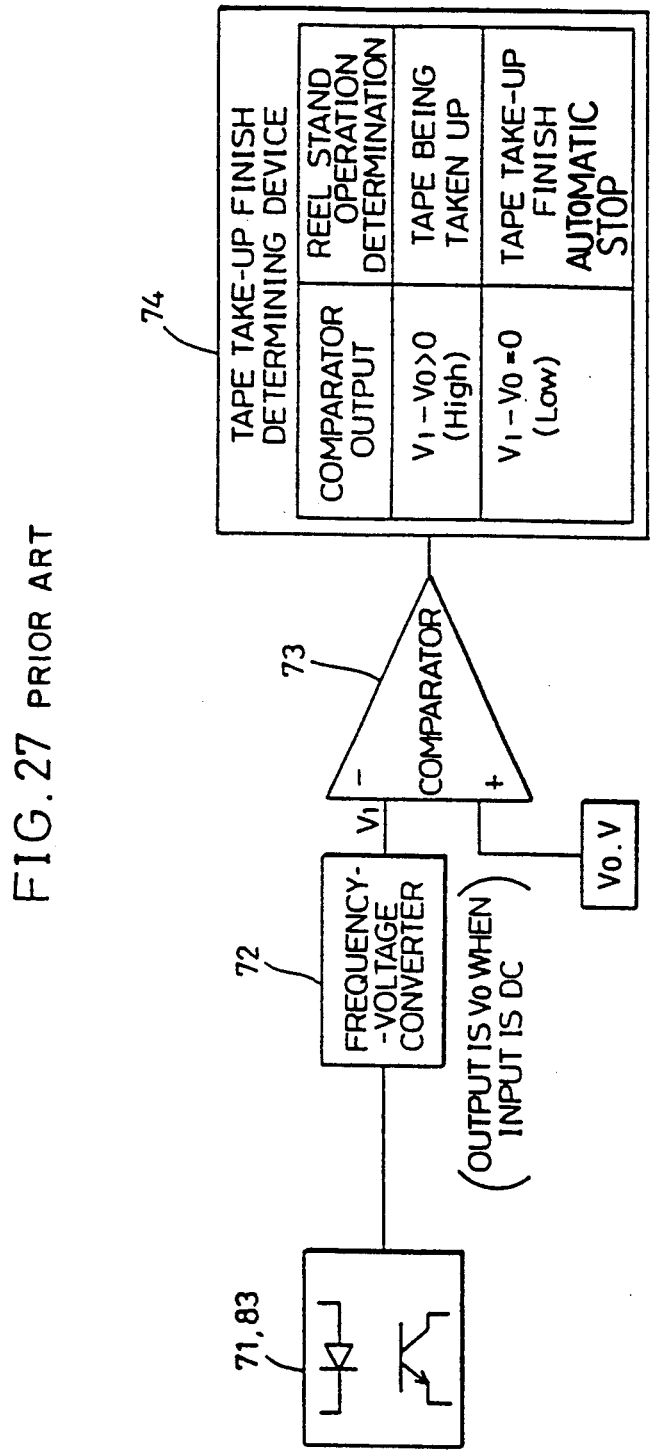
FIG. 27 is a block diagram showing structure of the take up detecting mechanism of cassette tape.
Figure 28:
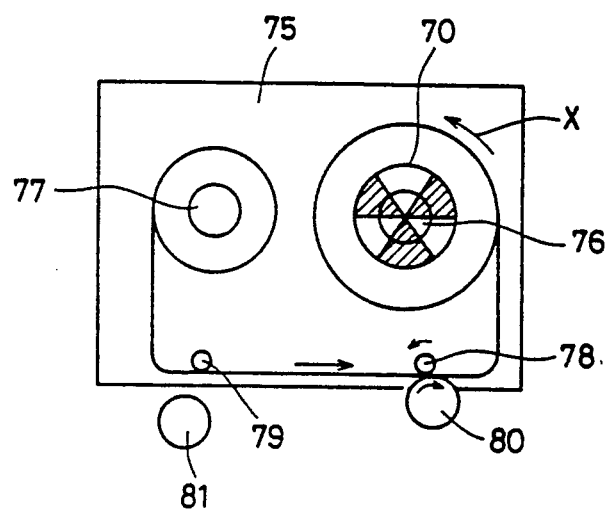
FIG. 28 is a structural schematic diagram for describing operation of a conventional magnetic recording/reproducing apparatus in the forward direction operation.
Figure 29:
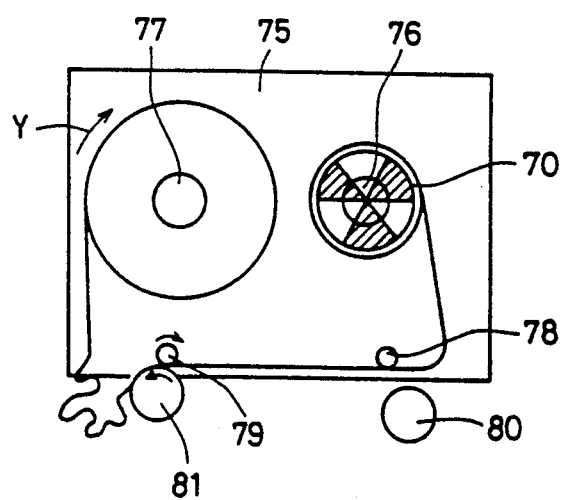
FIG. 29 is a plan structural view for describing operation in the reverse direction operation of a conventional magnetic recording/reproducing apparatus.

Next, the tape take-up detecting mechanism is described. Referring to FIGS. 1, 3, 5 and 6, reflection panel (rotation detecting body) 70 is provided on the same axis as that of reverse gear 51 (the sixth rotating body) for axis 2e, and rotates integrally with reverse gear 51. Two kinds of portions with different light reflectance ratios are arranged alternately for a predetermined angle around the central point of the disk on the surface of rotating plate 70. A light emitting light receiving element 71 is fixed at a position facing reflection panel 70 of main chassis 1. Light emitting light receiving element 71 itself emits light to reflection panel 70 and is provided at a position suitable to receive reflected light which is reflected on the surface of the reflection panel 70. Furthermore, light emitting light receiving element 71 is connected to frequency/voltage converter 72, comparator 73 and tape take-up finish determining device 74 as shown in FIG. 25. The structure of the tape take-up detecting device is same as the conventional structure shown in FIG. 25, so that the description thereof is not repeated here.

It is not limited to the structure in which reflection panel 70 is fixed to reverse gear 51, but it may be provided on the same axis as drive axis 10 so that it can rotates integrally with play gear 37 (the second rotating body). In this case, light emitting light receiving element 71 must be attached at a position facing to the surface of reflection panel 70 located coaxially with drive axis 10.

Next, operation of the above-described magnetic recording/reproducing apparatus according to the present invention will be described.

First, referring to FIG. 1, a standstill state is described. In the standstill state, the position of play idler lever 12 is held by head plate 16 and the position of FF/REW idler lever 13 is held by FF/REW torsion spring 22. Play idler gear 20 and FF/REW idler gear 21 are located on a center line between a pair of reel axes 2c and 2d. And furthermore, play idler gear 20 and FF/REW idler gear 21 are located so that they almost overlap with each other in a plane. The large-diameter gear 20a of play idler gear 20 is then being separated from small-diameter gear 37b of play gear 37 and the small-diameter gear 51b of reverse gear 51, and the small-diameter gear 20b of play idler gear 20 is being separated from the large-diameter gear 3a of FOR reel stand 3 and the large-diameter gear 4a of REV reel stand 4. Also, the large-diameter gear 21a of FF/REW idler gear 21 is being separated from the small-diameter gear 3b of FOR reel stand 3 and the small-diameter gear 4b of REV reel stand 4, and the small-diameter gear 21b is being separated from FF gear 35 and REW gear 50. Accordingly, even when pulley 11 receives the rotation power from motor 7 and rotates, both of reel stands 3 and 4 do not rotate.

Figure 7:
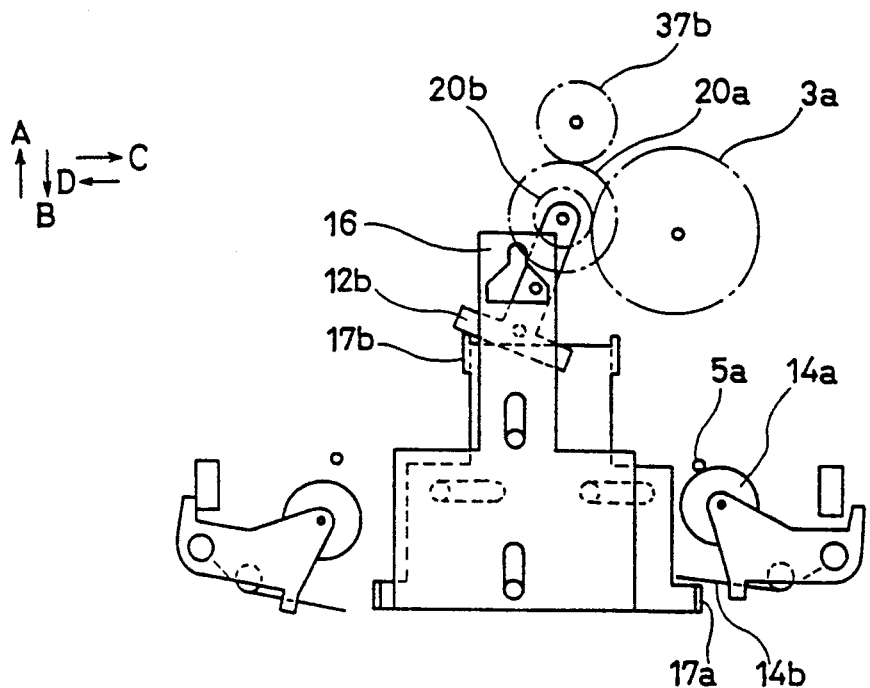
FIG. 7 is a plan structural view indicating positional relationship of rotating parts in the forward play mode.

Next, the forward play mode will be described. This mode corresponds to a forward direction reproducing mode and a forward direction recording mode. FIG. 7 is a plan structural view showing positional relationship of rotation parts in the forward play mode. Referring to FIGS. 5 through 7, head plate 16 moves in the direction of the arrow A with operation of the first cam from the above-described standstill state, reverse plate 17 makes play idler lever 12 pivot clockwise about axis 2b to bring the small-diameter gear 20b of play idler gear 20 into mesh with the large-diameter gear 3a of FOR reel stand 3, and bring the large-diameter gear 20a into mesh with the small-diameter gear 37b of play gear 37. When those gears are brought into mesh, the press force of reverse plate 17 is elastically absorbed by left arm portion 12b having elasticity.

Similarly, head plate 16 is moved by the first cam in the direction of the arrow A, FOR pinch roller spring 14b is then pressed in the direction of the arrow A by bend portion 17a of reverse plate 17. FOR pinch roller block 14 pivots clockwise about the axis 1a and the pinch roller 14a presses FOR capstan axis 5a to sandwich and hold tape. Then, the tape is driven at a constant speed in the direction of the arrow C. Furthermore, the bend portion 17b of reverse plate 17 presses left arm portion 12b of play idler lever 12. At this time, head plate 16 has somewhat moved in the direction of the arrow A and pin 12a of play idler lever 12 has gotten out of long hole 16a-1 of guide hole 16a of head plate 16. Accordingly, play idler lever 12 is pivotable about axis 2b and pivots clockwise around axis 2b by reverse plate 17.

The rotation transmitting path in the forward play mode is shown below.

Motor 7 (counterclockwise)→pulley 7a (counterclockwise)→fly belt 8→FOR fly wheel 5 counterclockwise)→fly pulley 5b (counterclockwise)→drive belt 9→pulley 11 (counterclockwise)→the first friction mechanism→friction plate 31 (counterclockwise) →spring bearing 30 (counterclockwise)→drive axis 10 (counterclockwise)→FF gear 35 (counterclockwise)→the second friction mechanism→play gear 37 (counterclockwise)→play idler gear 20→FOR reel stand 3 (counterclockwise).

Accordingly, FOR reel stand 3 runs tape in the forward direction at a constant speed with low torque, e.g., 35 g.cm through the second friction mechanism.

Next, the reverse play mode is described.

This mode corresponds to the reverse direction playback mode and the reverse direction recording mode.

Figure 8:
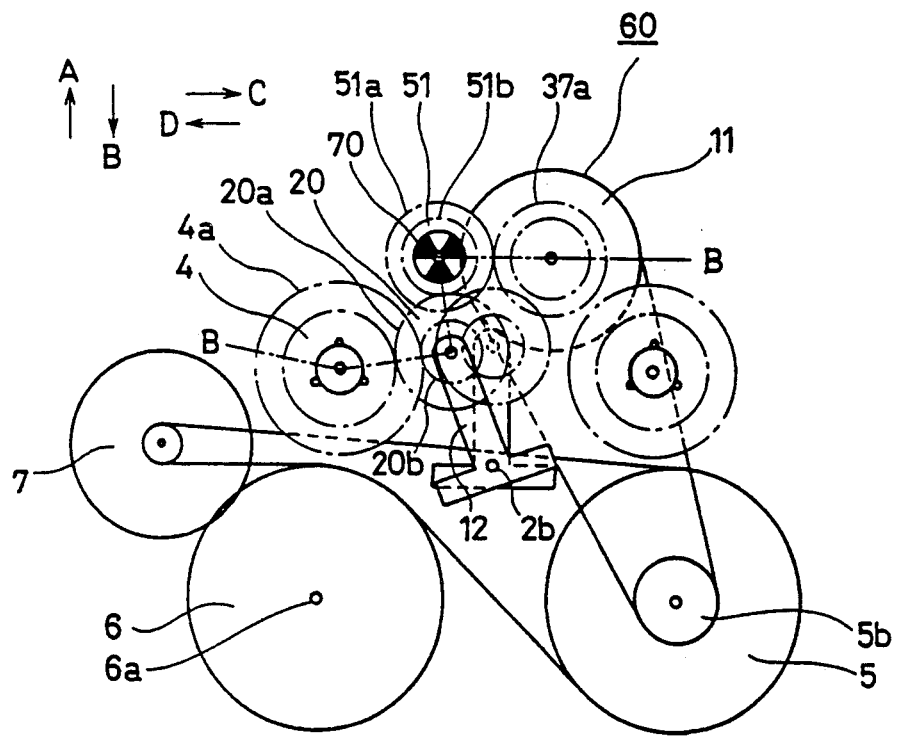
FIG. 8 is a plan structural view indicating positional relationships among rotating parts in a reverse play mode.
Figure 9:
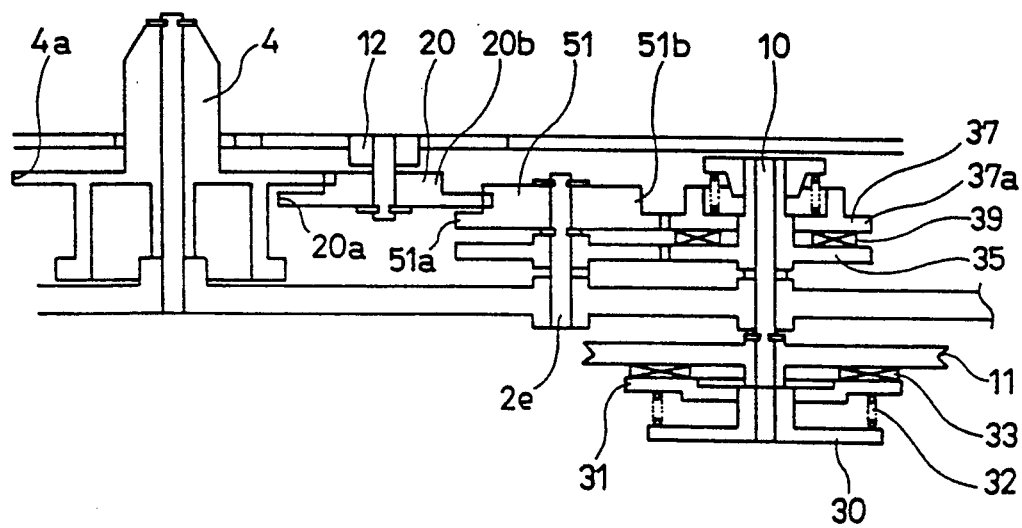
FIG. 9 is a cross sectional structural view taken along the cut line B—B in FIG. 8.
Figure 10:
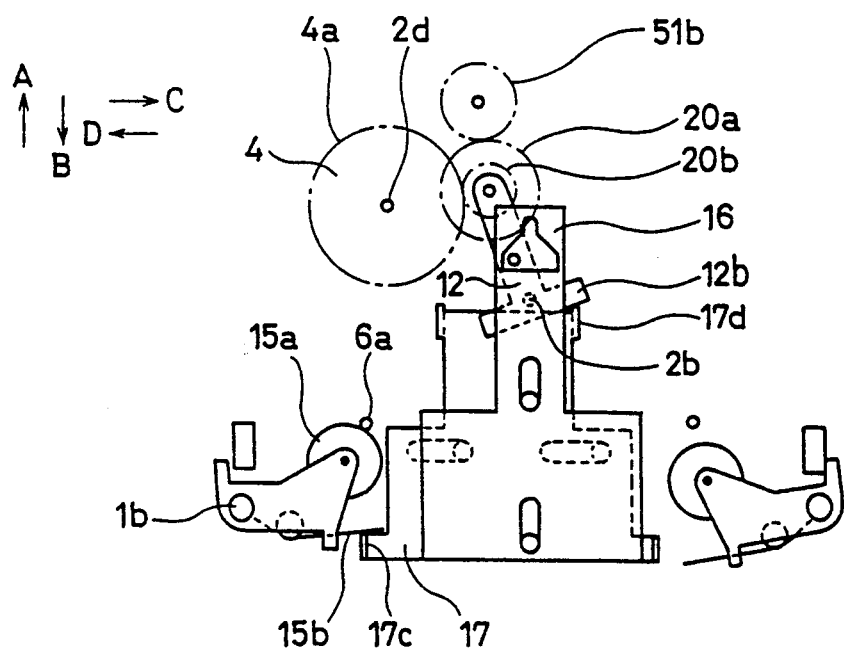
FIG. 10 is a plan structural view showing positional relationship among rotating parts and operating parts in the reverse play mode.

Referring to FIGS. 8 through 10, the second cam is triggered by reverse play operation means, and reverse plate 17 is moved in the direction of the arrow D via head plate 16 by the second cam. On completion of movement of reverse plate 17, the first cam is operated by the trigger means (not shown), and head plate 16 moves in the direction of the arrow A to implement the reverse play mode. The operation will be described in more detail below. When reverse plate 17 has moved in the direction of the arrow D, the bend portion 17c of reverse plate 17 faces to the arm of REV pinch roller spring 15b of REV pinch roller block 15, and also the bend portion 17d faces to right arm 12c of play idler lever 12. Then, when the head plate 16 moves in the direction of the arrow A, the bend portion 17c of reverse plate 17 presses REV pinch roller spring 15b in the direction of the arrow A, and REV pinch roller block 15 pivots counterclockwise about axis 1b. Then, pinch roller 15a presses REV capstan axis 6a to sandwich and hold tape, which is driven at a constant speed in the direction of the arrow D. The head thus applies recording or playback operation to the tape. Furthermore, bend portion 17d of reverse plate 17 presses right arm 12c, formed of elastic material, of play idler lever 12. Then, similarly to the mode switching from the above-described standstill state to the forward play state, play idler lever 12 is pivotable about axis 2b. Accordingly, play idler lever 12 pivots counterclockwise about the axis 2b. Thus, small-diameter gear 20b of play idler gear 20 meshes with large-diameter gear 4a of REV reel stand 4 and large-diameter gear 20a meshes with small-diameter gear 51b of reverse gear 51. After those gears mesh with each other, the pressing force of reverse plate 17 is elastically absorbed by right arm 12c having elasticity. The rotation transmitting path in the reverse play mode is shown below.

Pulley 11 (counterclockwise)→first friction mechanism→friction panel 31→spring bearing 30→drive axis 10→FF gear 35→second friction mechanism→play gear 37 (counterclockwise)→reverse gear 51 (clockwise)→play idler gear 20 (counterclockwise)→REV reel stand 4 (clockwise).

Accordingly, REV reel stand 4 runs tape at a constant speed in the opposite direction with low torque, e.g., 35 g.cm through the second friction mechanism.

Next, the forward direction fast forwarding mode (FF mode) is described.

Figure 11:
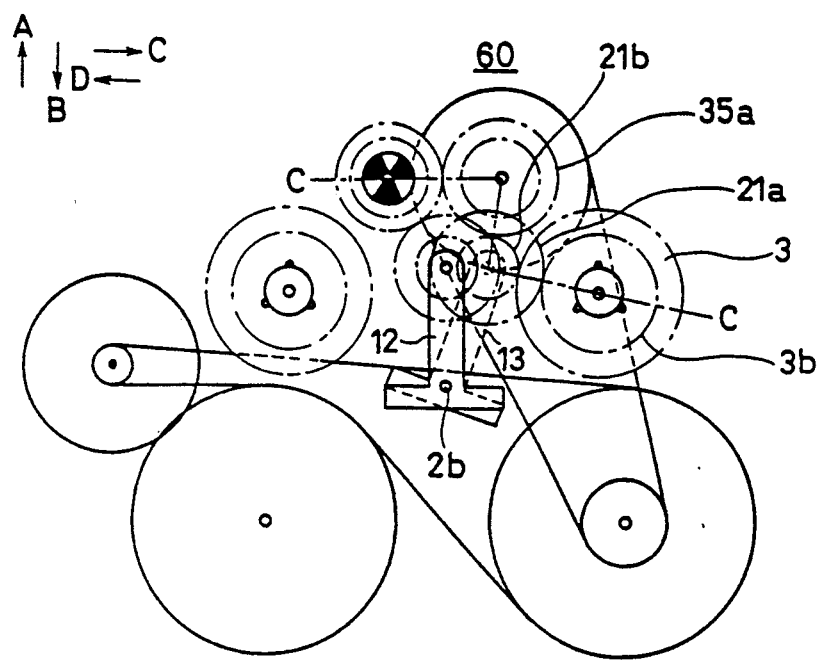
FIG. 11 is a plan structural view indicating positional relationship of rotating parts in a fast forward mode.
Figure 12:
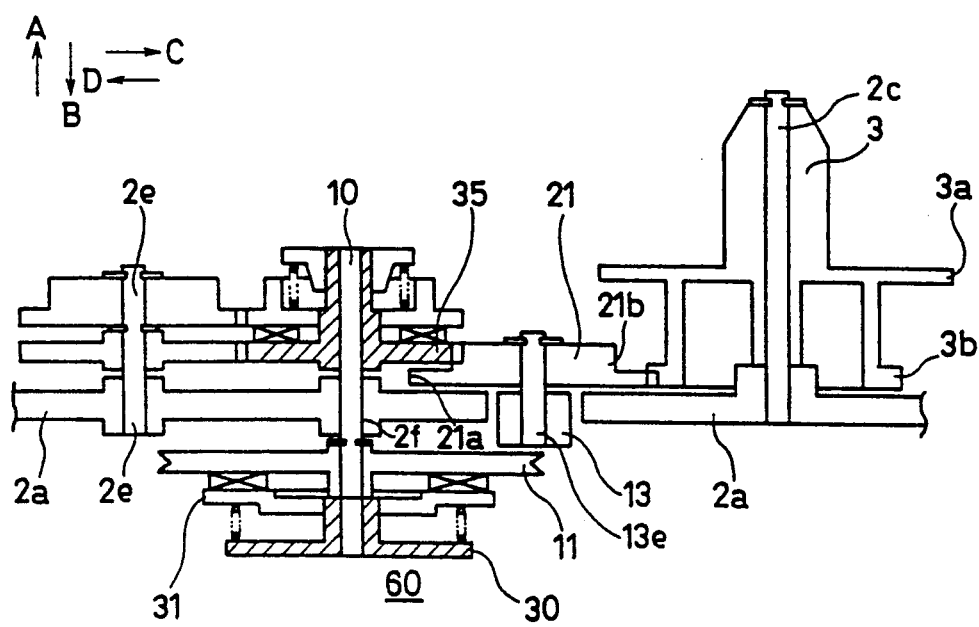
FIG. 12 is a cross sectional structural view taken along the cut line C—C in FIG. 11.
Figure 13:
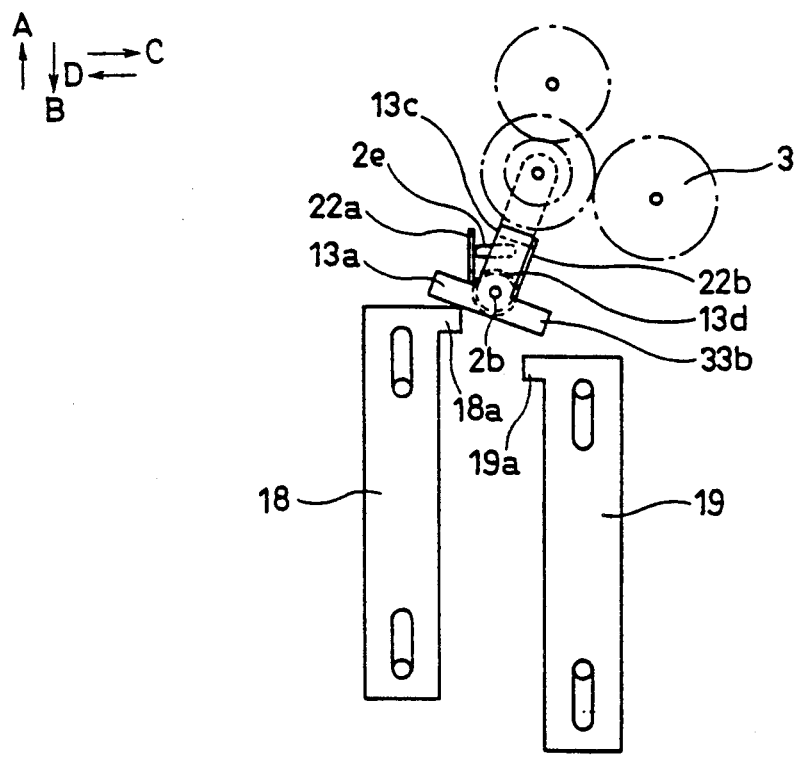
FIG. 13 is a plan structural view indicating positional relationship of rotating parts and operating parts in the fast forward mode.

Referring to FIGS. 11 and 13, FF lever 18 is, moved in the direction of arrow A, FF/REW idler lever 13 then pivots clockwise about axis 2b. Then, large-diameter gear 21a of FF/REW idler gear 21 is brought into mesh with small-diameter gear 3b of FOR reel stand 3 and small-diameter gear 21b is brought into mesh with gear 35a of FF gear 35. After these gears are brought into mesh, the pressing force of FF lever 18 is elastically absorbed by left arm 13a having elasticity. The rotation transmitting path in the FF mode is shown below.

Pulley 11 (counterclockwise)→the first friction mechanism→friction panel 31→spring bearing 30→drive axis 10→FF gear 35 (counterclockwise)→FF/REW idler gear 21 (clockwise)→FOR reel stand 3 (counterclockwise).

Accordingly, FOR reel stand 3 runs tape in the forward direction at a high speed with high torque, e.g., 80 g.cm only through the first friction mechanism. In the mode, play idler lever 12 is held at a position of the original standstill state.

Furthermore, the rewinding mode (REW mode) is described.

Figure 14:
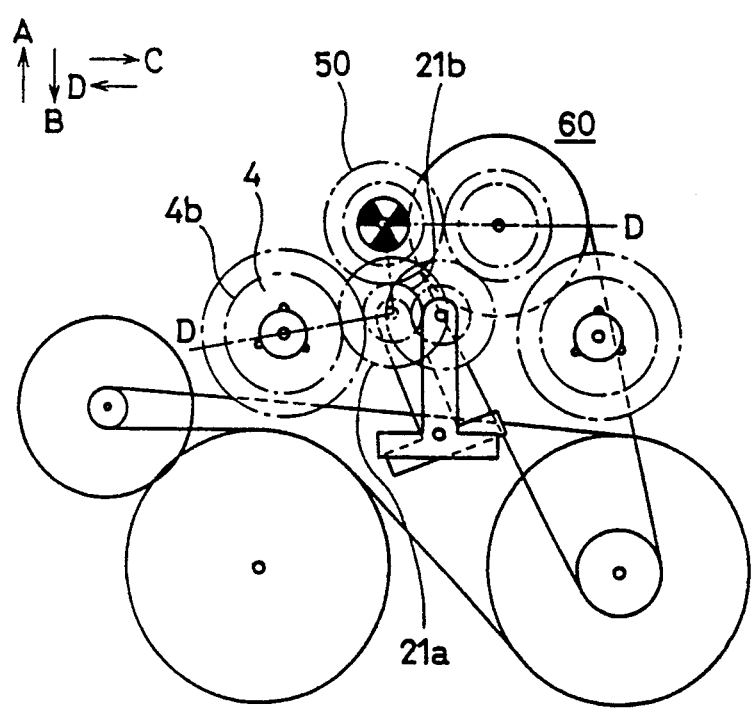
FIG. 14 is a plan structural view indicating positional relationship among rotation parts in the rewinding mode.
Figure 15:
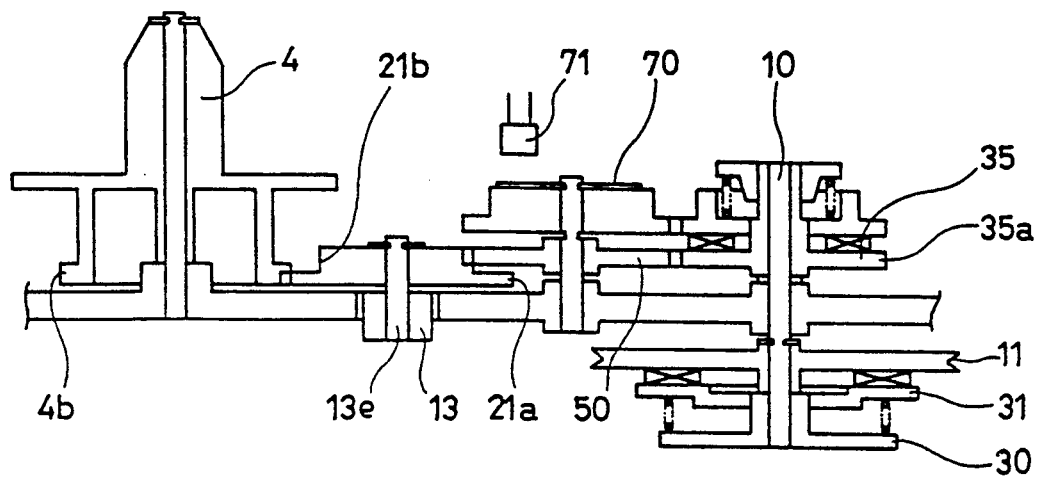
FIG. 15 is a cross sectional structural view taken along the cut line D—D in FIG. 14.
Figure 16:
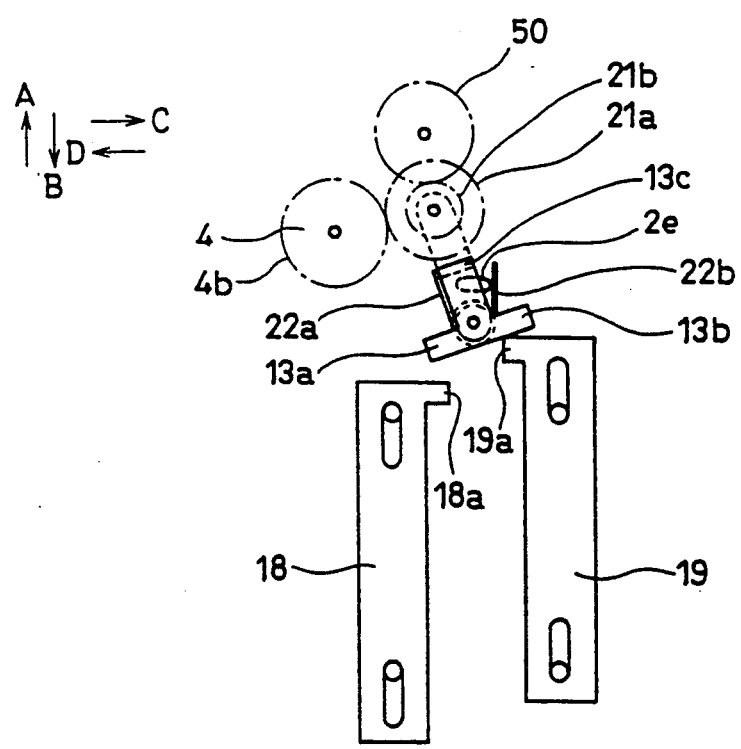
FIG. 16 is a plan structural view indicating positional relationship of rotating parts and operating parts in the rewinding mode.

Referring to FIGS. 14 through 16, REW 19 is moved in the direction of arrow A from the standstill state, FF/REW idler lever 13 then pivots counterclockwise about axis 2b. Then, large-diameter gear 21a of FF/REW idler gear 21 meshes with small-diameter gear 4b of REV reel stand 4, and small-diameter gear 21b meshes with REW gear 50. After these gears have been brought into mesh, the pressing force of REW lever 19 is elastically absorbed by right arm 13b having elasticity. The rotation transmitting path in the REW mode is shown below.

Pulley 11→the first friction mechanism→friction plate 31→spring bearing 30→drive axis 10→FF gear 35 →REW gear 50→FF/REW idler gear 21→REV reel stand 4.

Accordingly, REV reel stand 4 runs tape in the reverse direction at a high speed with high torque, e.g., 80 g.cm only through the first friction mechanism. Play idler lever 12 is maintained at a position in the standstill state in the REW mode.

Basic operations of the magnetic recording/reproducing apparatus of the present invention have been described above.

The magnetic recording/reproducing apparatus as described above has the following features.

(1) The structure of drive block 2 is made compact.

That is to say, the structure of drive block 2 is configured so that it satisfies the following three conditions.

① Let $\theta_1$ represent rotation angle from the standstill state to the play forward mode of play idler lever 12, let $\theta_2$ represent rotation angle thereof from the standstill state to the play reverse mode, let $\theta_3$ represent rotation angle thereof from the standstill state to the FF mode of FF/REW idler lever 13, and let $\theta_4$ represent rotation angle thereof from the standstill state to the REW mode, then the relation of $\theta_1 = \theta_2 \approx \theta_3 =_4$ is satisfied.

② Regarding the pivot radius $l_1$, $l_2$ of play idler gear 20 and FF/REW idler gear 21, the relation of $l_1 \approx l_2$ is satisfied.

③ Diameters of play idler gear 20 and FF/REW idler gear 21 are equal to each other.

When the conditions are satisfied, the movable ranges of play idler gear 20 and FF/REW idler gear 21 can be made equal. Then by the characteristics, by providing play idler lever 12 to which play idler gear 20 is attached and FF/REW idler lever 13 to which FF/REW idler gear 21 is attached overlapping on the same axis, the structure of drive block 2 can be made compact. It is possible to make strictly equal movable ranges of play idler lever 12 and play idler gear 20, and FF/REW idler lever 13 and FF/REW idler gear 21 by appropriately setting a value of the rotation transmission ratio from the motor in constant running and high speed take-up running of tape.

(2) A compact automatic reverse mechanism is configured having structure in which REV gear 50 and reverse gear 51 are provided on the same axis.

(3) It is configured so that play idler gear 20 and FF/REW idler gear 21 receive action force in the toothing direction about gears mutually mesh (the direction for strengthening the engagement among play idler gear 20 and FF/REW idler gear 21, and other gears which engage with them; hereinafter referred to as a toothing direction).

The structure is described below.

Figure 17:
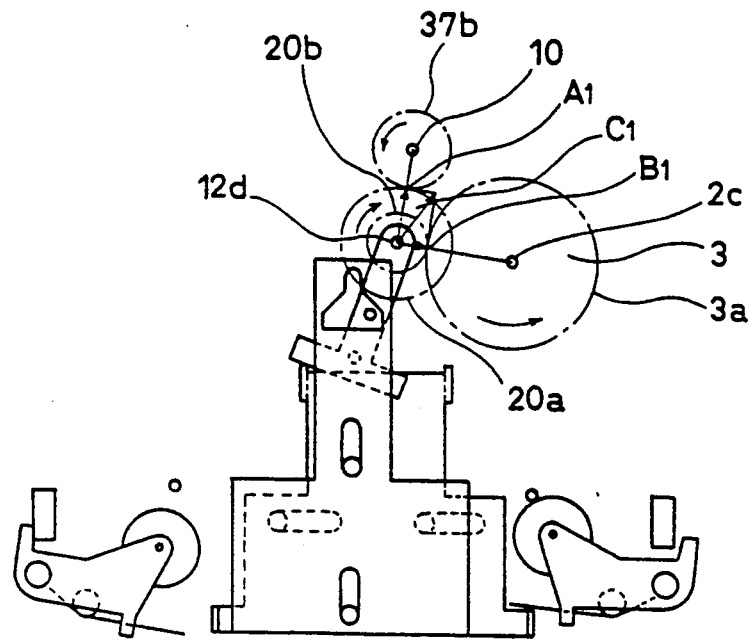
FIG. 17 is a plan view indicating loading condition of a play idler gear in the forward play mode.

Referring to FIG. 17, small-diameter gear 37b of play gear 37 rotating counterclockwise rotates large-diameter gear 20a of play idler gear 20 clockwise. That is to say, play idler gear 20 is provided with tangential force represented by vector A at the contact portion of large-diameter gear 20a and small-diameter gear 37b of play gear 37. Now, small-diameter gear 20b of play idler gear 20 which clockwise rotates makes large-diameter gear 3a of FOR reel stand 3 rotate counterclockwise. That is to say, play idler gear 20 works as a driving source for FOR reel stand 3. Accordingly, FOR reel stand 3 is provided with tangential force in the direction opposite to the vector $B_1$ at a contact portion of small-diameter gear 20b of play idler gear 20 and large-diameter gear 3a of FOR reel stand 3. Then, play idler gear 20 is provided with reaction force of load equal to vector $B_1$. Accordingly, play idler gear 20 receives load of the composite vector $C_1$ of the vector $A_1$ and vector $B_1$. The composite force effects in the toothing direction for play gear 37 and FOR reel stand 3. Accordingly, in the forward play mode, play idler gear 20 receives the action force in the toothing direction.

Figure 18:
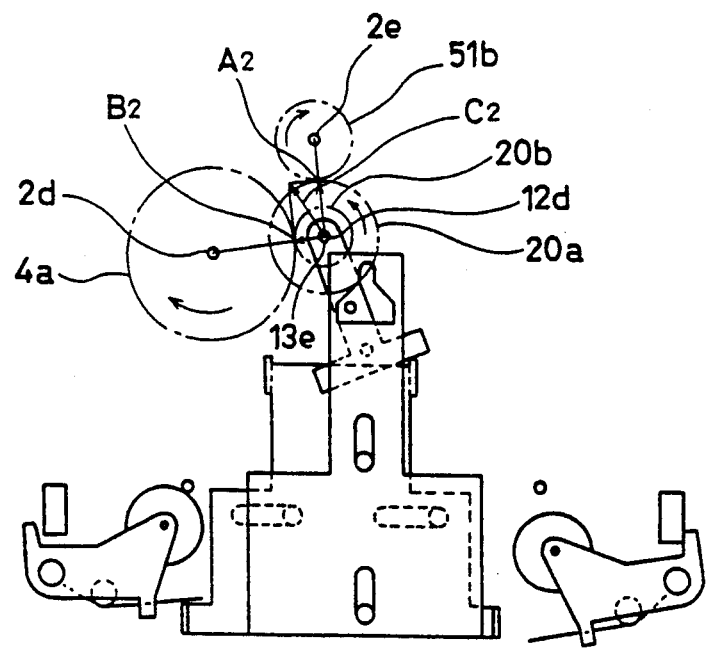
FIG. 18 is a plan view indicating loading condition of a play idler gear in the reverse play mode.

Referring to FIG. 18, small-diameter gear 51b of reverse gear 51 rotating clockwise rotates large-diameter gear 20a of play idler gear 20 counterclockwise. That is, reverse gear 51 works as a driving source for play idler gear 20. Accordingly, play idler gear 20 receives the tangential force represented by the vector $A_2$ at a contact and small-diameter gear 51b of reverse gear 51. On the other hand, small-diameter gear 20b of play idler gear 20 rotating counterclockwise rotates large-diameter gear 4a of REV reel stand 4 clockwise. That is, play idler gear 20 works as a driving source for REV reel stand 4. Accordingly, REV reel stand 4 receives the tangential force in the opposite direction to the vector $B_2$ at a contact portion of large-diameter gear 4a of REV reel stand 4 and small-diameter gear 20b of play idler gear 20. Play idler gear 20 then receives reaction force as load of the vector $B_2$. Accordingly, play idler gear 20 receives load of the composite vector $C_2$ of the vector $A_2$ and the vector $B_2$. The load $C_2$ works in the toothing direction for reverse gear 51 and REV reel stand 4. Accordingly, play idler gear 20 receives the action force in the toothing direction even in the reverse play mode.

Figure 19:
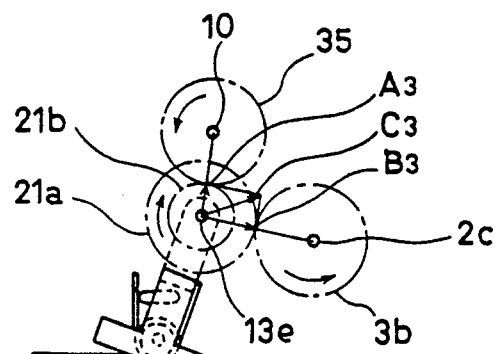
FIG. 19 is a plan view indicating loading condition of a FF/REW idler gear in the fast forward mode.

Referring to FIG. 19, FF gear 35 which rotates counterclockwise rotates small-diameter gear 21b of FF/REW idler gear 21 clockwise. That is, FF gear 35 works as a driving source for FF/REW idler gear 21. Accordingly, FF/REW idler gear 21 receives the tangential force represented by the vector $A_3$ at a contact portion of FF gear 35 and small-diameter gear 21b of FF/REW idler gear 21. On the other hand, large-diameter gear 21a of FF/REW idler gear 21 rotating clockwise rotates small-diameter gear 3b of FOR reel stand 3 counterclockwise. That is to say, FF/REW idler gear 21 works as a driving source for FOR reel stand 3. Accordingly, FOR reel stand 3 is provided with the tangential force in the opposite direction to the vector $B_3$ at a contact portion of small-diameter gear 3b of FOR reel stand 3 and large-diameter gear 21a of FF/REW idler gear 21. The FF/REW idler gear 21 receives the reaction force as load of the vector $B_3$. Accordingly, FF/REW idler gear 21 receives load of the composite vector $C_3$ of the vector $A_3$ and the vector $B_3$. The working direction of the composite force $C_3$ is the toothing direction to FF gear 35 and FOR reel stand 3. Accordingly, FF/REW idler gear 21 receives the action force in the toothing direction also in the FF mode.

Figure 20:
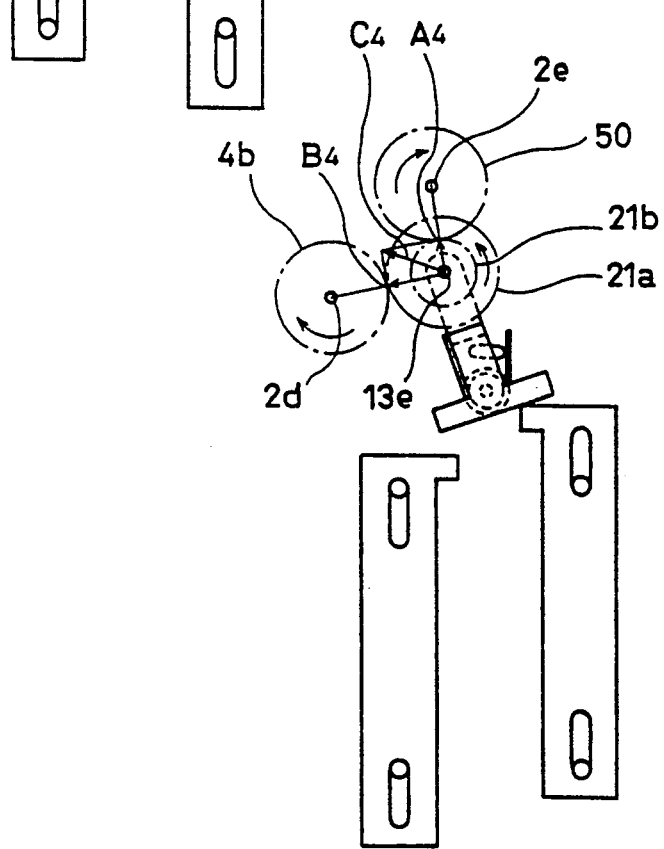
FIG. 20 is a plan view indicating loading condition of a FF/REW idler gear in the rewinding mode.
Figure 21:
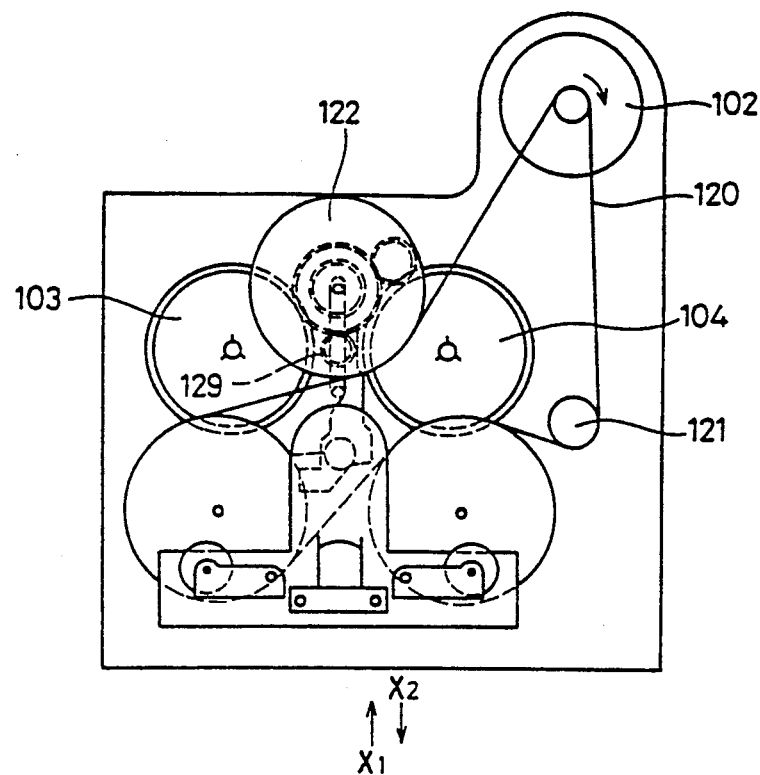
FIG. 21 is a plan structural view of a conventional magnetic recording/reproducing apparatus.
Figure 22:
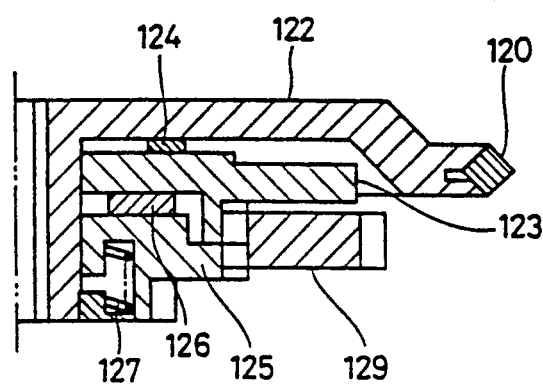
FIG. 22 is a main portion sectional structural view of FIG. 26.
Figure 23:
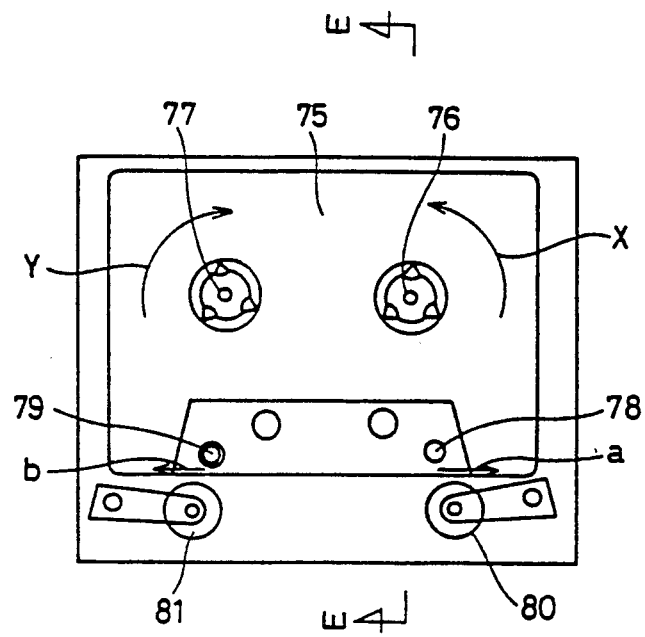
FIG. 23 is a main portion plan schematic diagram showing a drive portion of a magnetic recording/reproducing apparatus.
Figure 24:
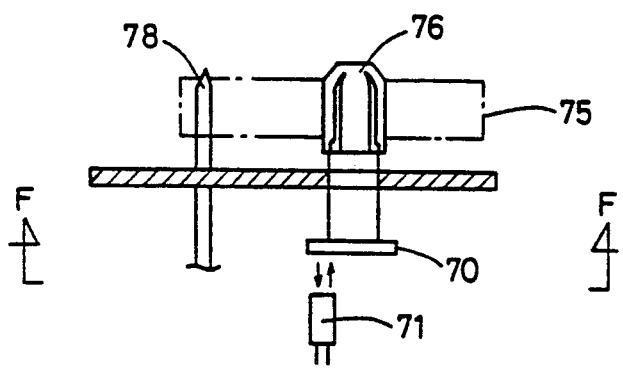
FIG. 24 is a cross sectional structural view taken along the cut line E—E in FIG. 17.

Referring to FIG. 20, REW gear 50 rotating clockwise rotates small-diameter gear 21b of FF/REW idler gear 21 counterclockwise. That is, REW gear 50 works as a driving source for FF/REW idler gear 21. Accordingly, FF/REW idler gear 21 receives the tangential force of the vector $A_4$ at a contact portion of small-diameter gear 21b of FF/REW idler gear 21 and REW gear 50. On the other hand, large-diameter gear 21a of FF/REW idler gear 21 rotating counterclockwise rotates small-diameter gear 4b of REV reel stand 4 clockwise. That is to say, FF/REW idler gear works as a driving source for REV reel stand 4. Accordingly, REV reel stand 4 receives the tangential force in the opposite direction to the vector $B_4$ at the contact portion of small-diameter gear 4b of REV reel stand 4 and large-diameter gear 21a of FF/REW idler gear 21. The FF/REW idler gear 21 receives the reaction force as load of the vector B₄. Accordingly, FF/REW idler gear 21 receives load of the composite vector C₄ of the vector A₄ and the vector B₄. The working direction of the composite force C₄ is the toothing direction of REW gear 50 and REV reel stand 4. Accordingly, FF/REW idler lever 21 receives the action force in the toothing direction.

As described above, in any operation modes, play idler gear 20 and FF/REW idler gear 21 receive the action force in the toothing direction.

In the above description, the more important point is that vector loads A₁–A₄, B₁–B₄ respectively working on play idler gear 20 and FF/REW idler gear 21 all work to pivot play idler lever 12 and FF/REW idler lever 13 in the toothing direction. In such conditions, when transmitting rotation force between first rotating bodies which are driving sources and rotating bodies which are terminal objects of the transmission with pivot rotation transmitting bodies interposed therebetween, engagement is surely implemented without any connection with which of the first rotating bodies and the terminal transmission target bodies are brought into mesh with pivot rotation transmission bodies. Accordingly, such structure is excellent in that the flexibility in designing arrangement of these rotating bodies is enhanced. The structure in which action force works on pivot rotate transmission bodies in the toothing direction enables to compensate for the errors of pivoting stroke of pivot rotate transmission bodies with the action force working in the toothing direction. Therefore, the flexibility in arrangement designing of a rotation system is enhanced accordingly.

The following conditions should be satisfied to make play idler gear 20 and FF/REW idler gear 21 receive the action force in the toothing direction in all the modes as described above.

① Play gear 37 and reverse gear 51 are located on the arrow A side than a line connecting rotation centers of FOR reel stand 3 and REV reel stand 4, and also they are provided at positions symmetrical about the perpendicular bisector of a line connecting rotation centers of FOR reel stand 3 and REV reel stand 4.

② FF gear 35 and play gear 37 provided on the same axis and REW gear 50 and reverse gear 51 further provided on the same axis are arranged symmetrical about the perpendicular bisector of the line connecting rotation centers of the two reel stands 3 and 4.

③ The pivot center 2b of play idler lever 12 and FF/REW idler lever 13 is located on the arrow B side than the line connecting rotation centers of play gear 37 and reverse gear 51 and also located on the perpendicular bisector of the segment connecting rotation centers of the two reel stands 3 and 4.

Although an example in which the first and second friction mechanisms are provided in friction block 60 has been described in the above embodiments, a third friction mechanism may be further provided between REW gear 50 and reverse gear 51. Providing the third friction mechanism enables to provide torque generating means only for use in the reverse play. For example, it is enabled to make torque differ in the forward play mode and in the reverse play mode, and the transmission loss of reverse gear 51 interposed between play gear 37 and REV reel stand 4 does not have to be considered.

Although means for reciprocating head plate 16 on which a head is provided is shown for pivoting play idler lever 12 in the above embodiment, a method using an overstroke lever may be introduced. This is useful in a magnetic recording/reproducing apparatus having sound interval detecting mechanism. The overstroke lever has such structure as described below. In a tape recorder, it is extremely important to keep the contact relation appropriate between tape and a head in playback and recording. Accordingly, it is an important problem to which extent the head moves in the tape contact direction when playing back. The quantity of movement of the head is referred to as a head stroke. In the above embodiment, the head plate 16 moves in the direction of the arrow A when reproducing with operation of the first cam. However, in such structure, the quantity of movement of head plate 16 slightly varies due to variation in parts accuracy. Therefore, an abut portion is provided on main chassis 1, and when the head plate 16 abuts against it, the movement of head plate 16 is limited so that the abutting state is of the most appropriate head stroke. However, only with operation of the first cam, the head stroke varies due to variation in parts and the like. Accordingly, an overstroke lever is necessary. That is, head plate 16 is moved by a stroke larger than a predetermined necessary stroke to move the overstroke lever. A tension spring is provided between the overstroke lever and the head plate. When the overstroke lever moves in the direction of arrow A, the head plate 16 is moved in the direction of the arrow A through the tension spring. When the head plate 16 abuts against the abut portion of main chassis 1, the head plate 16 does not move in the direction of the arrow A further more. The overstroke lever only moves in the direction of the arrow A. Then, the tension spring extends therebetween to absorb the overstroke.

When detecting sound intervals, the head position is moved slightly backwards in a range capable of having contact with tape, because abrasion of the head is considerable with the head stroke for reproducing, or because torque larger than the torque for normal high speed run is required due to the pad pressure on the tape side, for example. The amount of backward movement from the reproducing state to the sound interval detecting state is usually about 1.5–2.0 mm. If there is no overstroke, the engagement of play idler gear 20 and, FOR reel stand 3 or REV reel stand 4 has to be released only with the backward movement of about 1.5–2.0 mm. However, if reverse plate 17 is provided above the overstroke lever, the amount of movement of the overstroke lever from the reproducing state to the sound interval detecting state is a value obtained by adding the overstroke quantity, for example 1.0 mm, to the amount of backward movement of the head plate of about 1.5–2.0 mm. Accordingly, it is about 2.5–3.0 mm, so that the toothing between play idler gear 20 and FOR reel stand 3 or REV reel stand 4 can be canceled having a margin.

Next, operation of the tape take-up detecting mechanism will be described.

First, in the forward play mode, the rotation transmitting path is configured as follows as described before.

Motor 7 (counterclockwise)→pulley 7a (counterclockwise)→fly belt 8→FOR fly wheel 5 (counterclockwise)→fly pulley 5b (counterclockwise) drive belt 9→pulley 11 (counterclockwise)→first friction mechanism→friction plate 31 (counterclockwise) →spring bearing 30 (counterclockwise)→drive axis 10 (counterclockwise)→FF gear 35 (counterclockwise) second second friction mechanism→play gear 37 (counterclockwise)→play idler gear 20→FOR reel stand 3 (counterclockwise).

Separately from the transmission path, large-diameter gear 37a of play gear 37 and large-diameter gear 51a of reverse gear 51 engage with each other. Accordingly, in the forward play condition, reverse gear 51 also rotates receiving the rotating force of play gear 37. Accordingly, reflection panel 70 fixed to reverse gear 51 also rotates integrally with reverse gear 51. Accordingly, light emitting light receiving element 71 receives reflected light from rotating reflection panel 70, accepts the periodical signal, detects rotation conditions of reverse gear 51 with electrical determining means, and thereby detects that cassette tape is being taken up.

In the forward play mode as described above, when cassette magnetic tape has been taken up by a reel on FOR reel stand 3, the rotation of FOR reel stand 3 is stopped with the tension of tape. When the rotation of FOR reel stand 3 is interrupted, rotation of play idler gear 20 and play gear 37 is stopped. The rotation of reverse gear 51 which has been rotating engaging with large-diameter gear 37a of play gear 37 is thus stopped and the rotation of reflection panel 70 fixed to reverse gear 51 is also stopped. Accordingly, the rotation stop operation of reflection panel 70 is detected by an electrical detecting means through light emitting light receiving element 71, and a determination is made that the tape has been already taken up. Thus, an automatic stop mechanism operates to stop operation of the driving device.

With such detection of rotation stopping operation, if FOR reel stand 3 stops because of abnormal cause, for example, the automatic stop mechanism operates because a determination is made that the tape has been taken up even in the course of taking up cassette tape, to stop drive of the tape.

Next, the reverse play mode is described. The transmission path of rotation force in the reverse play mode is shown below.

Pulley 11→the first friction mechanism→friction plate 31→spring bearing 30→drive axis 10→FF gear 35 →the second friction mechanism→play gear 37→reverse gear 51→play idler gear 20→REV reel stand 4.

In this mode, reverse gear 51 rotates and the reflection panel 70 fixed to the reverse gear 51 is also integrally rotating.

When the magnetic tape of cassette tape has been taken up by the reel on the REV reel stand 4 side, the rotation of REV reel stand is interrupted by the tension of the tape. When the rotation of REV reel stand 4 stops, rotations of play idler gear 20, reverse gear 51 and play gear 37 are stopped, respectively. Accordingly, the rotation of reflection panel 70 fixed to reverse gear 51 also stops. A determination is thus made that the tape has been taken up, and the automatic stop mechanism operates to stop drive of the tape.

If the rotation of REV reel stand 4 is stopped in the course of taking up operation of tape due to some reason in this mode, the automatic stop mechanism works with operation similar to the above described one to smoothly terminate driven condition of tape.

Next, operation in the forward direction fast forward mode (FF mode) will be described. The transmission path of the rotation force in the FF mode is shown below.

Pulley 11→the first friction mechanism→friction panel 31→spring bearing 30→drive axis 10→FF gear 35 →FF/REW idler gear 21→FOR reel stand 3.

Furthermore, separately from the rotation transmission path, FF gear 35, the second friction mechanism, play gear 37, and reverse gear 51 are in rotating states independently of the drive system. Since reverse gear 51 rotates, reflection panel 70 also rotates.

When the tape has been taken up in this mode, the rotation of FOR reel stand 3 is interrupted by the tension of tape. When the rotation of FOR reel stand 3 stops, the rotation of FF/REW idler gear 21, FF gear 35, play gear 37 and reverse gear 51 is stopped. Accordingly, the tape take-up finish state is detected with stop of the rotation of reflection panel 70 which is integral with reverse gear 51 and the automatic stop mechanism operates to stop drive of cassette tape.

Furthermore, the rewinding mode (REW mode) is described. The transmission path of the rotation force of REW mode is shown below.

Pulley 11→the first friction mechanism→friction plate 31→spring bearing 30→drive axis 10→FF gear 35 →REW gear 50→FF/REW idler gear 21→REV reel stand 4.

Separately from the rotation force transmission path, FF gear 35, the second friction mechanism, play gear 37 and reverse gear 51 engage with each other and receive the rotation force to rotate. Reflection panel 70 is rotating integrally with reverse gear 51.

When the tape has been taken up in the REW mode, REW reel stand 4 is prevented from rotating by the tension of tape. On stop of rotation of REV reel stand 4, the rotation of FF/REW idler gear 21, REW gear 50 and FF gear 35 is stopped. Furthermore, play gear 37 and reverse gear 51 of the second friction mechanism linked to FF gear 35 is also stopped.

Accordingly, with stop of rotation of rotation panel 70 fixed to reverse gear 51, the tape take-up finish condition is determined, and the automatic stop mechanism operates to stop drive of tape.

As described above, in all the modes of constant speed, high speed running modes in the forward direction and the reverse direction, the take-up, and the take-up finish states of cassette tape can be detected. When a determination is made that the taking-up of the tape has finished, the automatic stop mechanism works to smoothly stop drive of the tape.

As described above, the magnetic recording/reproducing apparatus according to the present invention includes the first rotating body generating high torque through the first friction transmission means, and the second rotating body generating low torque through the second friction transmission means, which are provided independently of each other, wherein control of torque respectively required is facilitated to enable stable tape running operation in any of high speed running of tape requiring high torque and constant speed running requiring low torque. Also, since the first rotating body and the second rotating body generating predetermined torque are independent of each other, the structure of rotation transmitting means transmitting the predetermined torque generated by the two is simplified to enhance transmission efficiency.

Furthermore, by providing the third rotating body, fourth rotating body, and the first and second swinging members on the same axis as rotation transmitting means, the space in the structure can be saved.

Furthermore, making pivot ranges of rotation force transmitting means for the forward direction running of the tape and rotation force transmitting means for the reverse direction running substantially same, the structure can be made compact.

Furthermore, by providing the fifth rotating body and the sixth rotating body which always stays in mesh with the first rotating body and the second rotating body provided on the same axis, and also are located on the same axis, the so-called automatic reverse mechanism can be implemented.

Furthermore, with reel means, forward direction torque generating means, reverse direction torque generating means and rotation force transmitting means provided with predetermined positional relationship on a substrate, it is configured so that rotation bodies of rotation force transmitting means receive action force in the toothing direction for the driving source and the transmitted rotation body, which enables smooth transmission of rotation force and enhances reliability and transmission efficiency of rotation operation.

Furthermore, in the magnetic recording/reproducing apparatus according to the present invention, with a rotation detecting body provided on either of second or sixth rotation body which gangs with rotation operation of the first and second reels in constant speed run in the forward direction and the reverse direction, the tape take-up conditions can be determined without any connection with the direction of tape running, which enables sure automatic stopping operation in all operation conditions to prevent damage of the cassette tape and the like when the tape stops with abnormal conditions.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic recording/reproducing apparatus having recording/reproducing means in which a cassette tape provided therein runs at a constant speed and fast forwarding/rewinding modes in which the cassette tape runs at a high speed;
    a pair of first and second reel means which engage with the cassette tape for taking up the magnetic tape of said cassette tape in a predetermined direction;
    a motor for generating a rotating force;
    forward direction torque producing means having a pulley which receives the rotation force from said motor, a first rotation body disposed coaxially to said pulley, first rotation force delivering means provided between said pulley and said first rotation body for reducing the rotation force delivered from said pulley to said first rotation body to a predetermined value through slip, a second rotation body disposed coaxially to said pulley with said first rotation body between said pulley and said second rotation body, and second rotation force delivering means provided between said first rotation body and said second rotation body for further reducing the rotation force delivered from said first rotation body to said second rotation body through slip;
    reverse direction torque producing means having a fifth rotation body which engages with said first rotation body and rotates reversely to said first rotation body; and
    third rotation force delivering means having a third rotation body and a fourth rotation body,
    said third rotation body engaging simultaneously with each of said second rotation body and said first reel means of said forward direction torque producing means when said cassette tape runs at the constant speed in the recording/reproducing modes, thereby delivering the rotation force of said second rotation body to said first reel means,
    said fourth rotation body engaging simultaneously with each of said first rotation body and said first reel means of said forward direction torque producing means when said cassette tape runs at the high speed in the fast forwarding mode, thereby delivering the rotation force of said first rotation body to said first reel means, and engaging simultaneously with each of said fifth rotation body and said second reel means of said reverse direction torque producing means when the cassette tape runs at a high speed in the rewinding mode, thereby delivering the rotation force of said fifth rotation body to said second reel means.

2. The magnetic recording/reproducing apparatus according to claim 1, wherein
    said first rotation force delivery means comprises,
    first friction material which is in sliding-contact with said pulley, and
    first pressing means providing a predetermined press force to said first friction material, and
    said second rotation force delivering means comprises
    second friction material which is in sliding-contact with said first rotation body, and
    second pressing means provided independently of said first pressing means for providing a predetermined press force to said second friction material.

3. The magnetic recording/reproducing apparatus according to claim 1, wherein
    said third rotation force delivering means comprises,
    a rotation center axis, and
    first and second swinging members attached on said rotation center axis so as to provide a swinging movement of said members independently of each other about said rotation center axis,
    said third rotation body being attached to said first swinging member, and
    said fourth rotation body being attached to said second swinging member.

4. The magnetic recording/reproducing apparatus according to claim 3, wherein, in said third rotation force delivering means,
    said rotation center axis is provided on a perpendicular bisector of a segment connecting said first reel means and said second reel means, and
    a locus of said third rotation body pivoting from a position for engaging with said first reel means to a position for engaging with said second reel means and a locus of said fourth rotation body pivoting from a position for engaging with said first reel means in a position for engaging with said second reel means substantially coincide with each other.

5. A magnetic recording/reproducing apparatus having recording/reproducing modes in which a provided cassette tape runs at a constant speed in a forward direction and a reverse direction and having fast forwarding-/rewinding modes in which the tape runs at a high speed in a forward direction and a reverse direction, comprising:
- a pair of first and second reel means engaging with the cassette tape for taking up the magnetic tape of said cassette tape in a predetermined direction;
- a motor for producing a rotation force;
- forward direction torque producing means having a pulley receiving the rotation force from said motor, a first rotation body disposed coaxially to said pulley, first rotation force delivering means provided between said pulley and said first rotation body, for reducing the rotation force delivered from said pulley to said first rotation body to a predetermined value through slip, a second rotation body disposed coaxially to said pulley, and second rotation force delivering means provided between said first rotation body and said second rotation body for further reducing the rotation force delivered from said first rotation body to said second rotation body through slip;
- reverse direction torque producing means having a fifth rotation body engaging with said first rotation body and rotating reversely to said first rotation body, and a sixth rotation body disposed coaxially to said fifth rotation body, engaging with said second rotation body and rotating reversely to the rotation of said second rotation body; and
- third rotation force delivering means having a third rotation body and a fourth rotation body,
- said third rotation body engaging simultaneously with each of said second rotation body and said first reel means of said forward direction torque producing means when said cassette tape runs at the constant speed in the forward direction, thereby delivering the rotation force of said second rotation body to said first reel means, and engaging simultaneously with each of said sixth rotation body and said second reel means of said reverse direction torque producing means when said cassette tape runs at a constant speed in the reverse direction thereby delivering the rotation force of said sixth rotation body to said second reel means,
- said fourth rotation body engaging simultaneously with each of said first rotation body and said first reel means of said forward direction torque producing means when said cassette tape runs at a high speed in the forward direction, thereby delivering the rotation force of said first rotation body to said first reel means, and engaging simultaneously with each of the fifth rotation body and said second reel means of said reverse direction torque producing means when the tape runs at a high speed in the reverse direction, thereby delivering the rotation force of said fifth rotation body to said second reel means.

6. The magnetic recording/reproducing apparatus according to claim 5, wherein
said third rotation force delivering means comprises a rotation center axis, and
first and second swinging members provided on said rotation center axis so as to provide a swinging movement of said members independently of each other about said rotation center axis,
said third rotation body being attached to said first swinging member,
and said fourth rotation body being attached to said second swinging member.

7. The magnetic recording/reproducing apparatus according to claim 6, wherein
said forward direction torque producing means and said reverse direction torque producing means are provided substantially symmetrically about a perpendicular bisector of a segment connecting rotation centers of said first and second reel means, said forward direction torque producing means being adjacent to said first reel means, and said reverse direction torque producing means being adjacent to said second reel means, and
said third rotation force delivering means is provided so that the rotation center axis thereof is positioned on said perpendicular bisector.

8. The magnetic recording/reproducing apparatus according to claim 5 wherein each said first and second reel means comprises
a reel stand which engages with said cassette tape,
a reel axis rotationally supporting said reel stand, and
a seventh rotation body which engages with said third rotation body when said cassette tape is running at a constant speed and an eighth rotation body which engages with said fourth rotation body when said cassette tape is running at a high speed.

9. The magnetic recording/reproducing apparatus according to claim 5, further comprising rotation detecting means having a rotation detecting body which engages with either one of said second rotation body or said sixth rotation body and rotates, and a detecting device electrically detecting rotation movement of the rotation detecting body.

10. A magnetic recording/reproducing apparatus having recording/reproducing modes in which a cassette tape provided therein runs at a constant speed in a forward direction and a reverse direction, comprising:
- a pair of first and second reel means engaging with the cassette tape for taking up the magnetic tape of said cassette tape in a predetermined direction;
- a motor for producing a rotation force;
- a pulley receiving the rotation force from said motor;
- a play gear provided coaxially to said pulley, said play gear rotating when receiving a rotation force from said pulley;
- a reverse gear engaging with said play gear and rotating reversely to said play gear;
- an idler gear engaging simultaneously with each of said play gear and said first reel means when said cassette tape runs in the forward direction, thereby delivering a rotation force from said play gear to said first reel means, and engaging simultaneously with each of said reverse gear and said second reel means when said cassette tape runs in the reverse direction, thereby delivering a rotation force from said reverse gear to said second reel means; and
- rotation detection means having a rotation detection body which rotates when engaged with one of said play gear and said reverse gear and a detection device for electrically detecting the rotation movement of the rotation detection body.

11. A magnetic recording/reproducing apparatus as recited in claim 10, wherein
said rotation detection body is disposed coaxially to said reverse gear so as to rotate integrally with said reverse gear.

* * * * *